US009244314B2

(12) United States Patent
Choi et al.

(10) Patent No.: US 9,244,314 B2
(45) Date of Patent: Jan. 26, 2016

(54) LIQUID CRYSTAL DISPLAY

(75) Inventors: Kook Hyun Choi, Seoul (KR); Sung Hoon Kim, Seoul (KR); Hong-Jo Park, Asan-si (KR); Mee Hye Jung, Suwon-si (KR); Woo Sung Sohn, Seoul (KR); Jae-Yong Shin, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 1160 days.

(21) Appl. No.: 13/244,163

(22) Filed: Sep. 23, 2011

(65) Prior Publication Data

US 2012/0182514 A1 Jul. 19, 2012

(30) Foreign Application Priority Data

Jan. 17, 2011 (KR) .......................... 10-2011-0004666

(51) Int. Cl.
*G02F 1/1343* (2006.01)
*G02F 1/1337* (2006.01)

(52) U.S. Cl.
CPC .............. *G02F 1/134309* (2013.01); *G02F 2001/133742* (2013.01); *G02F 2201/123* (2013.01); *G02F 2201/124* (2013.01)

(58) Field of Classification Search
CPC ................................................ G02F 1/134309
See application file for complete search history.

(56) References Cited

U.S. PATENT DOCUMENTS

| 2007/0097305 A1* | 5/2007 | Lin et al. ........................ 349/141 |
| 2009/0207328 A1* | 8/2009 | Hur et al. ......................... 349/37 |
| 2009/0310047 A1 | 12/2009 | Shin et al. |
| 2010/0134707 A1* | 6/2010 | Kim et al. ....................... 349/37 |
| 2011/0222004 A1* | 9/2011 | Kim ............................... 349/106 |

FOREIGN PATENT DOCUMENTS

| CN | 1605921 A | 4/2005 |
| CN | 101609235 A | 12/2009 |
| JP | 07-092504 A | 4/1995 |
| JP | 2009-301010 A | 12/2009 |
| KR | 1020090130610 A | 12/2009 |
| KR | 1020090131190 A | 12/2009 |
| TW | 201001389 A | 1/2010 |
| WO | 2010/137428 A1 | 12/2010 |

* cited by examiner

*Primary Examiner* — Dennis Y Kim
(74) *Attorney, Agent, or Firm* — Cantor Colburn LLP

(57) ABSTRACT

A liquid crystal display includes a first substrate, a second substrate, a liquid crystal layer between the substrates and including liquid crystal molecules, a first pixel electrode, and a second pixel electrode. The pixel electrodes each include a stem at an edge of a pixel area, and a plurality of branches extended from the stem. The branches of the pixel electrodes are alternately disposed. The liquid crystal display further includes a first region including a first interval between the branches of the first pixel electrode and adjacent branches of the second pixel electrode, and a second region including a second interval between the branches of the first pixel electrode and the adjacent branches of the second pixel electrode which is smaller than the first interval. The first region is where the stems of the first pixel electrode and the second pixel electrode are not disposed.

34 Claims, 15 Drawing Sheets

(a)   (b)

LIQUID CRYSTAL DISPLAY

This application claims priority to Korean Patent Application No. 10-2011-0004666 filed on Jan. 17, 2011, and all the benefits accruing therefrom under 35 U.S.C. §119, the entire contents of which are incorporated herein by reference.

BACKGROUND OF THE INVENTION (a) Field of the Invention

The invention relates to a liquid crystal display.

(b) Description of the Related Art

A liquid crystal display (hereinafter referred to as an "LCD") is one of the most widely used flat panel displays. The LCD includes two display panels provided with electric field generating electrodes, such as pixel electrodes and a common electrode, and a liquid crystal layer interposed between the two display panels. In the LCD, voltages are applied to the electric field generating electrodes to generate an electric field in the liquid crystal layer. Due to the generated electric field, liquid crystal molecules of the liquid crystal layer are aligned and polarization of incident light is controlled, thereby displaying images.

To improve the display quality of the liquid crystal display, it is necessary to realize a liquid crystal display having a high contrast ratio, excellent viewing angle, and fast response speed.

Also, as an arrangement of the liquid crystal molecules is scattered by an external influence such as pressure, it is important to prevent display quality deterioration such as stains.

The above information disclosed in this Background section is only for enhancement of understanding of the background of the invention and therefore it may contain information that does not form the prior art that is already known in this country to a person of ordinary skill in the art.

BRIEF SUMMARY OF THE INVENTION

Exemplary embodiments of the invention provide a liquid crystal display having excellent display characteristics as well as a high contrast ratio and a wide viewing angle, and simultaneously a fast response speed of liquid crystal molecules.

An exemplary embodiment of a liquid crystal display includes a first substrate and a second substrate, a liquid crystal layer interposed between the first and second substrates and including liquid crystal molecules, and a first pixel electrode and a second pixel electrode disposed on the first substrate and separated from each other. The first pixel electrode and the second pixel electrode include a stem, and a plurality of branches extended from the stem. The branches of the first pixel electrode and the branches of the second pixel electrode are alternately disposed. A first region includes a first interval between the branches of the first pixel electrode and the branches of the second pixel electrode, and a second region includes a second interval between the branches of the first pixel electrode and the branches of the second pixel electrode smaller than the first interval. The first region includes where the stems of the first pixel electrode and the second pixel electrode are not disposed at an edge of the pixel area.

In an exemplary embodiment, the liquid crystal layer may be vertically aligned.

In an exemplary embodiment, the first pixel electrode and the second pixel electrode may be applied with voltages having different polarities with respect to a reference voltage.

In an exemplary embodiment, in the first region, the first interval between the branches of the first pixel electrode and the branches of the second pixel electrode may be uniform, and in the second region, the second interval between the branches of the first pixel electrode and the branches of the second pixel electrode may be uniform.

In an exemplary embodiment, a ratio of the areas of the first region and the second region may be in a range of about 2:1 to about 30:1.

In an exemplary embodiment, the first interval between the branches of the first pixel electrode and the branches of the second pixel electrode may be in the range about 10 micrometers (μm) to about 20 μm, and the second interval between the branches of the first pixel electrode and the branches of the second pixel electrode may be in a range about 3 μm to about 10 μm.

In an exemplary embodiment, the first region further includes an extension portion where an interval between the branches of the first pixel electrode and the branches of the second pixel electrode is larger than the first interval between the branches of the first pixel electrode and the branches of the second pixel electrode in the first region.

In an exemplary embodiment, the interval between the branches of the first pixel electrode and the branches of the second pixel electrode may be in a range of about 20 μm to about 28 μm in the extension portion.

In an exemplary embodiment, the plane shape of the branches of the first pixel electrode and the branches of the second pixel electrode is circular in the extension portion.

In an exemplary embodiment, the plane shape of the branches of the first pixel electrode and the branches of the second pixel electrode is rhomboidal in the extension portion.

In an exemplary embodiment, the plane shape of the branches of the first pixel electrode and the branches of the second pixel electrode is quadrangular in the extension portion.

In an exemplary embodiment, the plane shape of the branches of the first pixel electrode and the branches of the second pixel electrode is hexagonal in the extension portion.

In an exemplary embodiment, the plane shape of the branches of the first pixel electrode and the branches of the second pixel electrode is polygonal in the extension portion.

In an exemplary embodiment, the liquid crystal display may further include a conductor disposed on the first substrate, transversing the center of the pixel area, and applied with a voltage having the same polarity as a signal applied to the first pixel electrode. The branches of the second pixel electrode near the edge insulated from and intersecting the conductor while forming an acute angle along with the conductor among the edge of the branches of the first pixel electrode may form a second region, and the branches of the second pixel electrode near the edge insulated from and intersecting the conductor while forming an obtuse angle along with the conductor among the edge of the branches of the first pixel electrode may form a first region.

In an exemplary embodiment, the branches of the pixel electrodes may include a first edge parallel to an outer portion of the pixel area, and a width of the branches defined with the first edge may be decreased closer to an end of the branches.

In an exemplary embodiment, the liquid crystal display may further include a third region where a third interval between the branches of the first pixel electrode and the branches of the second pixel electrode is smaller than the first interval and is larger than the second interval.

In an exemplary embodiment, the liquid crystal display may further include a fourth region where a fourth interval between the branches of the first pixel electrode and the branches of the second pixel electrode is different from the intervals of the first region, the second region, and the third region.

According to the exemplary embodiments of the invention, a high contrast ratio and a wide viewing angle of the liquid crystal display may be simultaneously ensured, the response speed of the liquid crystal molecule may be fast, and excellent display characteristics may be obtained.

DETAILED DESCRIPTION OF THE INVENTION

Figure 1:
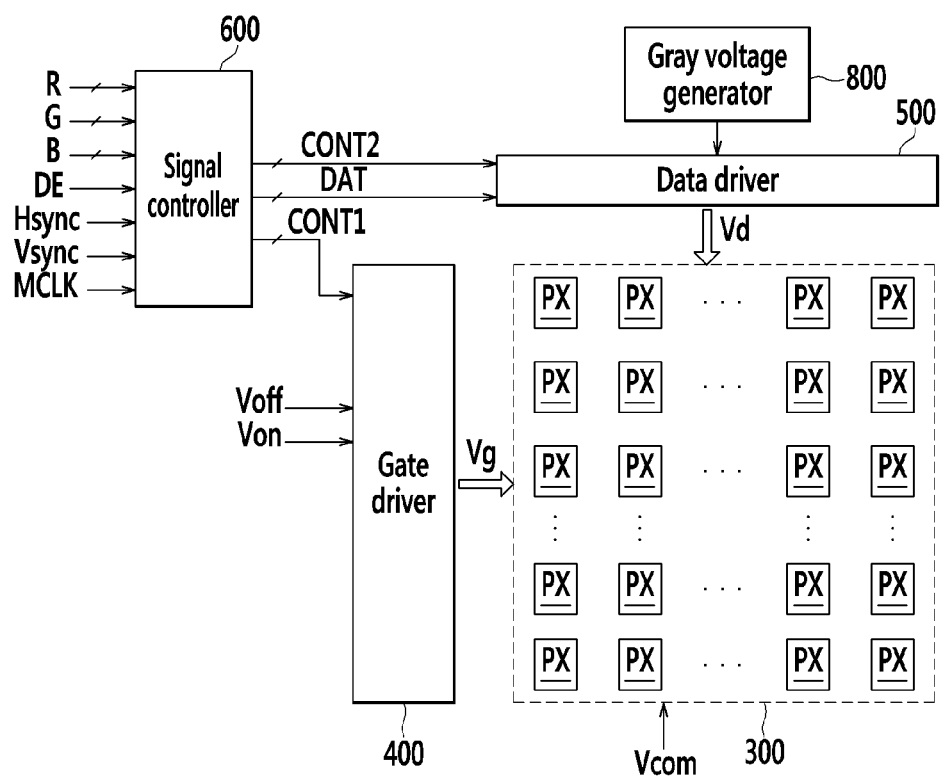
FIG. 1 is a block diagram of an exemplary embodiment of a liquid crystal display according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "lower," "under," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "under" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be described in detail with reference to the accompanying drawings.

A liquid crystal display according to exemplary embodiments of the invention will now be described with reference to accompanying drawings.

Figure 2:
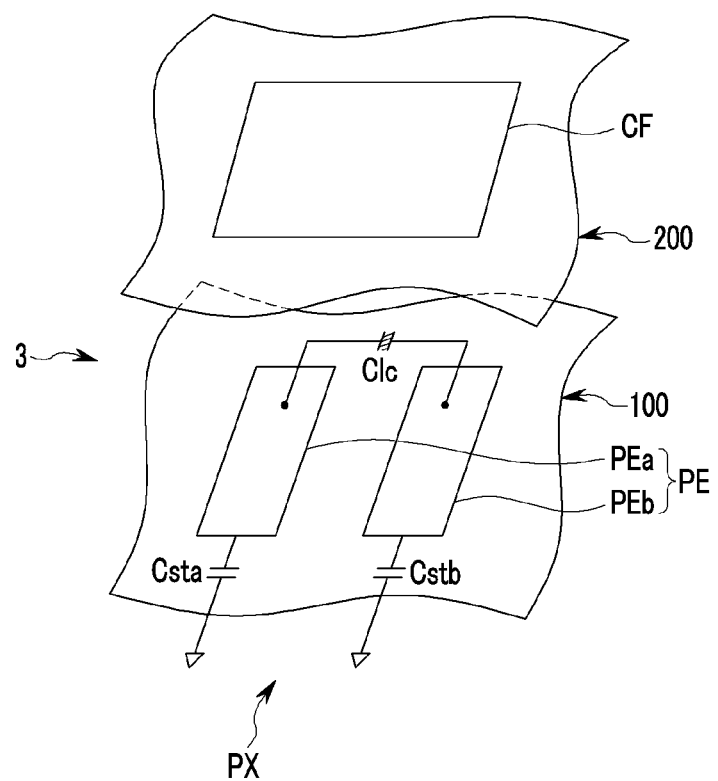
FIG. 2 is an equivalent circuit diagram showing an exemplary embodiment of a structure of one pixel in a liquid crystal display according to the invention.
Figure 3:
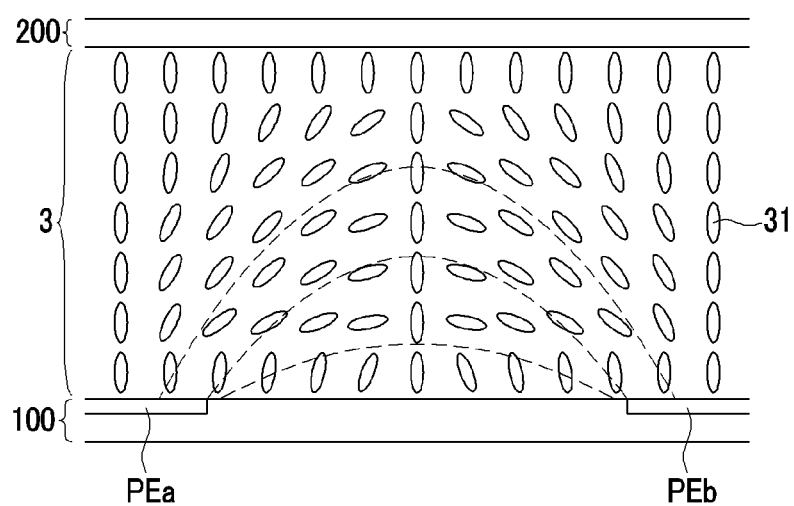
FIG. 3 is a schematic cross-sectional view of an exemplary embodiment of a liquid crystal display according to the invention.

Firstly, a liquid crystal display according to the invention will be described with reference to FIG. 1 to FIG. 3. FIG. 1 is an exemplary embodiment of a block diagram of a liquid crystal display according to the invention, FIG. 2 is an equivalent circuit diagram showing an exemplary embodiment of a structure of one pixel of a liquid crystal display according to the invention, and FIG. 3 is a schematic cross-sectional view of an exemplary embodiment of a liquid crystal display according to the invention.

Referring to FIG. 1, a liquid crystal display includes a liquid crystal panel assembly 300, a gate driver 400, a data driver 500, a gray voltage generator 800, and a signal controller 600.

The liquid crystal panel assembly 300 includes a plurality of signal lines (not shown), and a plurality of pixels PX connected thereto and arranged in an approximate matrix format. In the structure shown in FIG. 2, the liquid crystal panel assembly 300 includes a lower panel 100 and an upper panel 200 facing each other, and a liquid crystal layer 3 interposed therebetween. A pixel may also be hereinafter referred to as a pixel region or pixel area.

The signal lines include a plurality of gate lines transmitting gate signals (referred to as "scanning signals") and a plurality of pairs of data lines transmitting data voltages. The gate lines are arranged in parallel to each other and longitudinally extend approximately in a row direction (e.g., a first direction), and the data lines are arranged in parallel to each other and longitudinally extend approximately in a column direction (e.g., a second direction).

Each pixel PX includes a liquid crystal capacitor Clc, and the liquid crystal capacitor Clc adopts a first pixel electrode PEa and a second pixel electrode PEb of the lower panel 100 as two terminals, and the liquid crystal layer 3 between the first and second pixel electrodes PEa and PEb serves as a dielectric material.

The liquid crystal layer 3 has dielectric anisotropy, and liquid crystal molecules 31 of the liquid crystal layer 3 may be arranged such that their long axes are aligned perpendicular to surfaces of the two panels 100 and 200 when an electric field is not applied.

A pixel electrode PE includes the first and second pixel electrodes PEa and PEb. A common electrode CE (not shown) may be further formed on different layers from the pixel electrode or on the same layer to the pixel electrode. In addition, the pixel electrode and the common electrode may be disposed on the different substrate from each other. The first and second storage capacitors Csta and Cstb serving as assistants of the liquid crystal capacitor Clc may be formed by further including separate electrodes (not shown) provided on the lower panel 100 and interposed between the first and second pixel electrodes PEa and PEb, and insulators. Although not shown, another exemplary embodiment of a liquid crystal display according to the invention may include an additional electrode on the upper panel 200 and applied with a predetermined voltage of a constant magnitude, and the additional electrode may be transparent.

In order to realize color display, each pixel PX uniquely displays one of primary colors (spatial division), or each pixel PX temporally and alternately displays primary colors (temporal division). Then, the primary colors are spatially or temporally synthesized, and thus a desired color is recognized. An exemplary embodiment of the primary colors may include three primary colors of red, green, and blue, or yellow, cyan, and magenta. Also, each pixel may display a mixture color of the primary colors or white. One exemplary of the spatial division is represented in FIG. 2, where each pixel PX is provide with a color filter CF indicating one of the primary colors, on the region of the upper panel 200 and corresponding to the first and second pixel electrodes PEa and PEb. Unlike FIG. 2, the color filter CF may be on or below the first and second pixel electrodes PEa and PEb of the lower panel 100.

At least one polarizer (not shown) for providing light polarization is provided in the liquid crystal panel assembly 300.

Next, an exemplary embodiment of a driving method of a liquid crystal display according to the invention will be described with reference to FIG. 3 as well as FIG. 1 and FIG. 2.

FIG. 3 is a schematic cross-sectional view of an exemplary embodiment of a liquid crystal display according to the invention.

Referring to FIG. 3, the first pixel electrode PEa is applied with a first voltage, the second pixel electrode PEb is applied with a second voltage, and the first voltage and the second voltage respectively applied to the first pixel electrode PEa and the second pixel electrode PEb may have different polarities. Here, the first voltage and the second voltage applied to the first pixel electrode PEa and the second pixel electrode PEb are voltages corresponding to luminance for displaying by the pixel PX.

The difference between the first voltage and the second voltage applied to the first and second pixels PXa and PXb is expressed as a charged voltage of the liquid crystal capacitors Clc, e.g., a pixel voltage. If a potential difference is generated between two terminals of the liquid crystal capacitor Clc, as shown in FIG. 3, an electric field parallel to the surface of the display panel 100 and 200 is formed in the liquid crystal layer 3 between the first and second pixel electrodes PEa and PEb. When the liquid crystal molecules 31 have positive dielectric anisotropy, the liquid crystal molecules 31 are arranged such that the long axes thereof are aligned parallel to the direction of the electric field, and the degree of inclination is changed according to the magnitude of the pixel voltage. This liquid crystal layer 3 is referred to as an electrically-induced optical compensation ("EOC") mode liquid crystal layer. Also, the change degree of the polarization of light passing through the liquid crystal layer 3 is changed according to the inclination degree of the liquid crystal molecules 31. The change of the polarization appears as a change of transmittance of the light by the polarizer, and accordingly, the pixel PX displays the desired predetermined luminance.

Next, one exemplary embodiment of the above-described liquid crystal display will be described with reference to FIG. 4 and FIG. 5.

Figure 4:
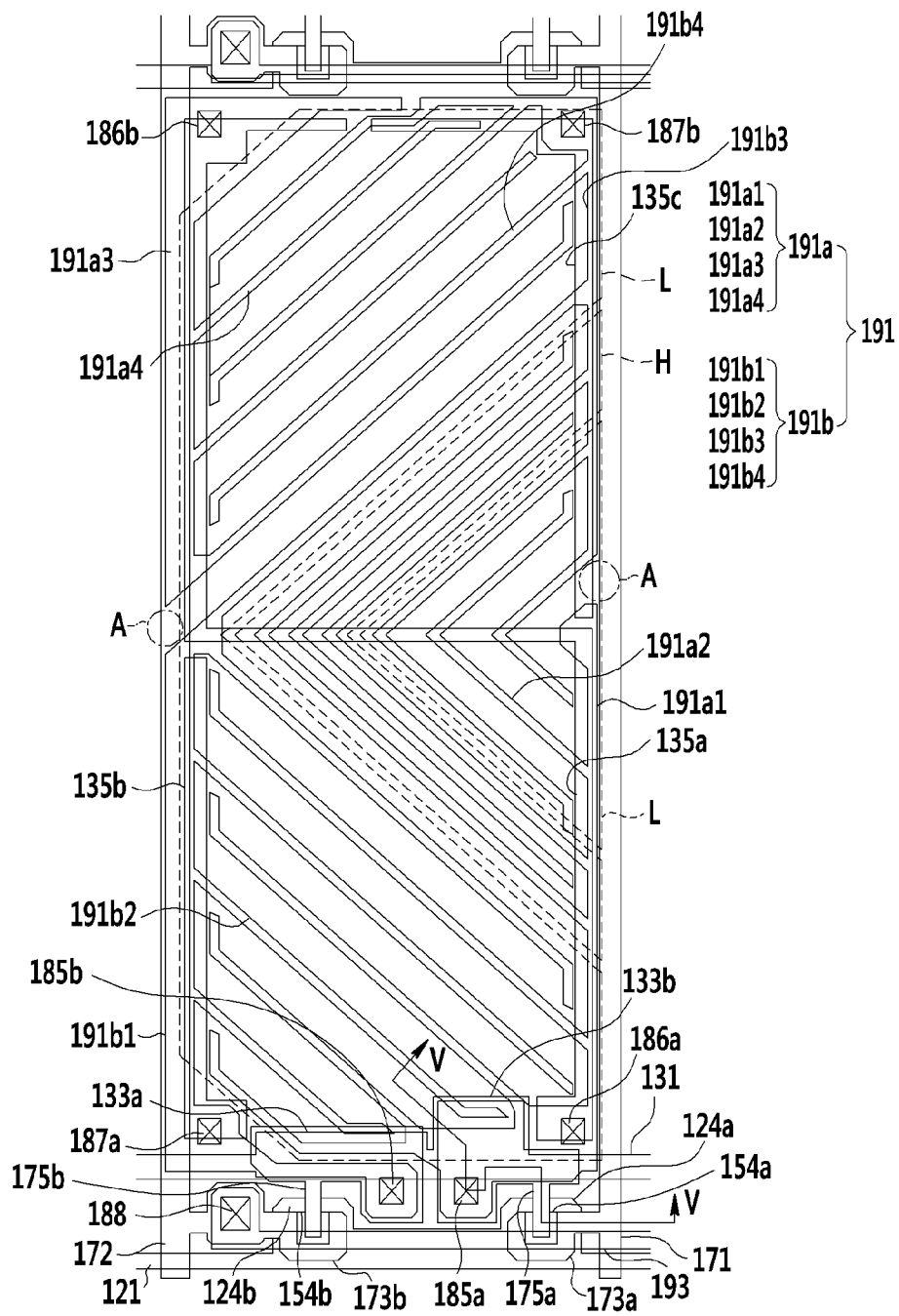
FIG. 4 is a plan view of an exemplary embodiment of a liquid crystal display according to the invention.
Figure 5:
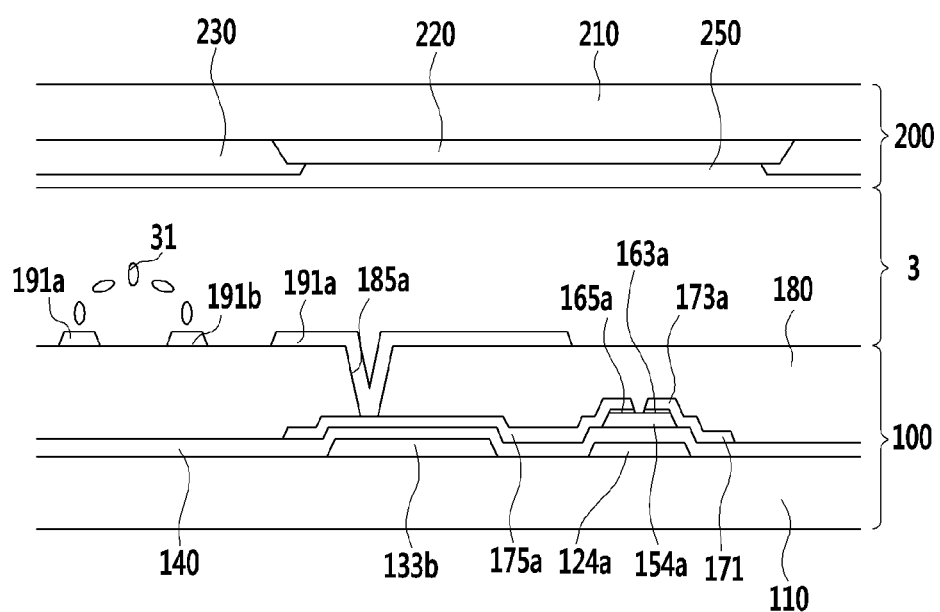
FIG. 5 is a cross-sectional view of the liquid crystal panel assembly FIG. 4 taken along line V-V.

FIG. 4 is a plan view of an exemplary embodiment of a liquid crystal display according to the invention, and FIG. 5 is a cross-sectional view of the liquid crystal panel assembly FIG. 4 taken along line V-V.

Referring to FIG. 4 and FIG. 5, a liquid crystal panel assembly includes the lower panel 100 and the upper panel 200 facing each other, and a liquid crystal layer 3 interposed between two display panels 100 and 200.

Firstly, the lower panel 100 will be described.

A plurality of gate conductors including a plurality of gate lines 121, a plurality of storage electrode lines 131, and first to third connection conductors 135a, 135b, and 135c are on a first insulation substrate 110.

The gate lines 121 transmitting gate signals longitudinally extend in a transverse direction. Each gate line 121 includes a plurality of pairs of a first gate electrode 124a and a second gate electrode 124b protruding upward from a main portion of the gate line 121 and in a longitudinal direction.

The storage electrode lines 131 are applied with a predetermined voltage, and mainly extend in the transverse direction. Each storage electrode line 131 is positioned between two neighboring gate lines 121 and is closer to the lower of the neighboring gate lines 121 in the plan view. Each storage electrode line 131 includes a plurality of first storage electrodes 133a and second storage electrodes 133b protruding upward from a main portion of the storage electrode line 131 and in the longitudinal direction. The connection conductors 135a, 135b, and 135c are disposed at an edge and a center of a pixel area.

The gate conductors may have a single layer or a multilayered structure.

A gate insulating layer 140 including silicon nitride (SiNx) or silicon oxide (SiOx) is on the gate conductor.

A plurality of pairs of a first semiconductor 154a and a second semiconductor 154b including hydrogenated amorphous silicon or polysilicon are on the gate insulating layer 140. The first semiconductor 154a and the second semiconductor 154b are positioned overlapping the first gate electrode 124a and the second gate electrode 124b, respectively.

A pair of ohmic contacts 163a and 165a overlap each of the first semiconductors 154a, and a pair of ohmic contacts (not shown) overlap each of the second semiconductors 154b. The ohmic contact 163a and 165a may include a material such as n+ hydrogenated amorphous silicon, which is highly doped with an n-type impurity such as phosphorous (P), or of silicide. In another exemplary embodiment of a liquid crystal display according to the invention, the ohmic contacts 163a and 165a may be omitted. In detail, when the first semiconductor 154a and the second semiconductor 154b include an oxide semiconductor, the ohmic contacts 163a and 165a may be omitted.

A data conductor including a data line 171, a first voltage transmitting line 172, and a plurality of pairs of a first drain electrode 175a and a second drain electrode 175b is on the ohmic contacts 163a and 165a and the gate insulating layer 140.

The data line 171 transmitting data signals, mainly extends in the longitudinal direction and intersects the gate line 121 and the storage electrode line 131. The data line 171 includes a first source electrode 173a which extends from a main portion of the data line 171 and is curved with a "U" shape toward the first gate electrode 124a in the plan view.

The first voltage transmitting line 172 transmits a first voltage of the constant magnitude, and extends parallel to the data line 171 thereby intersecting the gate line 121 and the storage electrode line 131. The first voltage transmitting line 172 includes a second source electrode 173b which extends from a main portion of the first voltage transmitting line 172 and is curved with the "U" shape toward the second gate electrode 124b in the plan view.

The first voltage transmitted through the first voltage transmitting line 172 may have the constant magnitude during one frame, and the polarity thereof may be changed per frame. In one exemplary embodiment, for example, if a maximum voltage of the liquid crystal display is 15 volts (V), the magnitude of the first voltage transmitted through the first voltage transmitting line 172 during the first frame may be 0V, and the magnitude of the first voltage transmitted through the first voltage transmitting line 172 during the second frame after the first frame may be 15V. In this case, if an arbitrary reference voltage is about 7.5V, the first voltage transmitted by the first voltage transmitting line 172 has the constant magnitude during one frame, and the polarity thereof may be changed per frame. However, the magnitude of the first voltage transmitted through the first voltage transmitting line 172 may be constant during a plurality of frames, and in this case, the polarity of the first voltage transmitted through the first voltage transmitting line 172 may be changed per the plurality of frames.

The first drain electrode 175a and the second drain electrode 175b each include a bar-shaped first end, and a second end having a wide area in the plan view. The bar-shape includes a relatively long, evenly shaped member. The bar ends of the first drain electrode 175a and the second drain electrode 175b are opposite to the first source electrode 173a and the second source electrode 173b with respect to the first gate electrode 124a and the second gate electrode 124b, and are partially enclosed by the curved first source electrode 173a and second source electrode 173b, respectively. The wide ends of the first drain electrode 175a and the second drain electrode 175b are electrically connected to a first pixel electrode 191a and a second pixel electrode 191b through a first contact hole 185a and a second contact hole 185b that will be described later.

The first gate electrode 124a, the first source electrode 173a, and the first drain electrode 175a form a first thin film transistor ("TFT") along with the first semiconductor 154a, and a channel of the first TFT is formed on the first semiconductor 154a between the first source electrode 173a and the first drain electrode 175a.

The second gate electrode 124b, the second source electrode 173b, and the second drain electrode 175b form a second TFT along with the second semiconductor 154b, and a channel of the second TFT is formed on the second semiconductor 154b between the second source electrode 173b and the second drain electrode 175b.

The data conductors 171, 172, 175a, and 175b may have a single layer or a multilayered structure.

The ohmic contacts 163a and 165a are interposed only between the underlying semiconductors 154a and 154b and the overlying data conductors 171, 172, 175a, and 175b thereon, respectively, and reduce contact resistance therebetween. The semiconductors 154a and 154b include exposed portions that are not covered by the data conductors 171, 172, 175a, and 175b, and portions that are disposed between the source electrodes 173a and 173b and the drain electrodes 175a and 175b.

A passivation layer 180 including an inorganic insulator or organic insulator is on the data conductors 171, 172, 175a, and 175b, and the exposed portions of the semiconductors 154a and 154b.

The passivation layer 180 has a plurality of the first and second contact holes 185a and 185b exposing the wide ends of the first drain electrode 175a and the second drain electrode 175b. The passivation layer 180 and the gate insulating layer 140 have a plurality of contact holes 186a, 186b, 187a, and 187b exposing portions of the first to third connection conductors 135a, 135b, and 135c. In addition, the passivation layer 180 has a plurality of contact holes 188 exposing the first source electrode 173a.

A plurality of pixel electrodes 191 including a transparent conductive material such as indium tin oxide ("ITO") or indium zinc oxide ("IZO"), or a reflective metal such as aluminum, silver, chromium, or alloys thereof are on the passivation layer 180. The pixel electrodes 191 include a plurality of pairs of the first and second pixel electrodes 191a and 191b. In addition, a connection member 193 is on the passivation layer 180.

As shown in FIG. 4, an entire outer shape of one pixel electrode 191 is a quadrangle, and the first pixel electrode 191a and the second pixel electrode 191b are engaged with each other. That is, portions of the first pixel electrode 191a and the second pixel electrode 191b alternate with each other in the longitudinal and transverse directions. The first pixel electrode 191a and the second pixel electrode 191b are symmetrical with respect to an imaginary transverse central line of the pixel electrode 191, and are respectively divided into two sub-regions, such as an upper sub-region and a lower sub-region.

The first pixel electrode 191a includes a lower stem 191a1 and an upper stem 191a3, and a plurality of first branches 191a2 and a plurality of second branches 191a4 extending from the lower stem 191a1 and the upper stem 191a3, respectively. The second pixel electrode 191b includes a lower stem 191b1 and an upper stem 191b3, and a plurality of third branches 191b2 and a plurality of fourth branches 191b4 extending from the lower stem 191b1 and the upper stem 191b3, respectively. As illustrated in FIG. 4 the branches 191a2 and 191b2 are slanted downward to the right from a middle of the pixel, and branches 191a4 and 191b4 are slanted upward to the right from the middle of the pixel.

The lower stem 191a1 and the upper stem 191a3 of the first pixel electrode 191a are disposed on the right side and the left side of one pixel electrode, and the lower stem 191b1 and the upper stem 191b3 of the second pixel electrode 191b are disposed on the left side and the right side of the one pixel electrode, respectively.

By this, the magnitude of the parasitic capacitance formed by overlapping the data line 171 and the first voltage transmitting line 172 that are disposed on the left side and the right side of the one pixel electrode and the pixel electrode 191 may be formed to be symmetrical on the left side and the right side of the pixel electrode 191, such that the magnitudes of the parasitic capacitances between the first pixel electrode 191a and the second pixel electrode 191b, and the two left and right signal lines, may be the same. As a result, crosstalk deterioration generated by the deviation of the right and left parasitic capacitances may be reduced or effectively prevented.

The angle of the plurality of branches 191a2, 191a4, 191b2, and 191b4 of the first pixel electrode 191a and the second pixel electrode 191b, with respect to the transverse center line, may be about 45 degrees.

The branches 191a2, 191a4, 191b2, and 191b4 of the first pixel electrode 191a and the second pixel electrode 191b engage with each other with a predetermined interval therebetween and are alternately disposed, thereby forming a pectinated pattern. In one exemplary embodiment, the interval between the branches 191a2, 191a4, 191b2, and 191b4 of the first pixel electrode 191a and the second pixel electrode 191b is preferably within about 30 micrometers (μm). The interval between adjacent branches 191a2, 191a4, 191b2, and 191b4 may be taken perpendicular to a longitudinal direction of the branches 191a2, 191a4, 191b2, and 191b4.

The branches 191a2, 191a4, 191b2, and 191b4 of the first pixel electrode 191a and the second pixel electrode 191b engage with each other and are alternately disposed, thereby forming a pectinated pattern. A low gray region L is indicated by a dotted line in FIG. 4 where the interval between the neighboring branches is wide, and a high gray region H is indicated by a dotted line in FIG. 4 where the interval between the neighboring branches is narrow. The high gray region H is disposed substantially at the center of the pixel area and is enclosed by the low gray region L.

In detail, in the case of the low gray region L where the interval between the branches of the first pixel electrode 191a and the branches of the second pixel electrode 191b that are alternately disposed is wide, the intensity of the electric field applied to the liquid crystal layer 3 between the branches of the first pixel electrode 191a and the branches of the second pixel electrode 191b is decreased such that a relative low gray is displayed even though the same voltage is applied compared with the high gray region H where the interval between the neighboring branches is narrow. Conversely, in the case of the high gray region H where the interval between the branches of the first pixel electrode 191a and the branches of the second pixel electrode 191b that are alternately disposed is narrow, the intensity of the electric field applied to the liquid crystal layer 3 between the branches of the first pixel electrode 191a and the branches of the second pixel electrode 191b is increased such that the relative high gray is displayed even though the same voltage applied compared with the low gray region L where the interval between the neighboring branches is wide.

It is possible to vary the inclination angle of the liquid crystal molecules 31 of the liquid crystal layer 3 and display different luminance with respect to one image information set by varying the interval between the first pixel electrodes 191a and the second pixel electrodes 191b in one pixel. Further, it is possible to maximally make an image viewed from a side of the liquid crystal display closer to an image viewed from a front of the liquid crystal display by properly adjusting the interval between the branches of the first pixel electrode 191a and the second pixel electrode 191b. Therefore, it is possible to improve side visibility and enhance transmittance.

In the liquid crystal display according to the illustrated exemplary embodiment, a ratio of a total planar area of the low gray region L to a total planar area of the high gray region H may be in the range of about 2:1 to about 30:1, and in detail, about 4:1 to about 30:1. Also, the interval between the branches of the first pixel electrode 191a and the second pixel electrode 191b may be about 10 μm to about 20 μm in the low gray region L, and the interval between the branches of the first pixel electrode 191a and the second pixel electrode 191b may be about 3 μm to about 10 μm in the high gray region H.

A portion of the low gray region L is disposed in portion A that is not enclosed by the stems 191a1, 191a3, 191b1, and 191b3 of the first pixel electrode 191a and the second pixel electrode 191b among the pixel outer portion of the liquid crystal display according to the illustrated exemplary embodiment, such that a region where the magnitude of the horizontal electric field between the first pixel electrode 191a and the second pixel electrode 191b is relatively weak is disposed. Accordingly, the display quality deterioration that can be generated by asymmetry of the direction of the horizontal electric field between the first pixel electrode 191a and the second pixel electrode 191b such as texture, may be reduced.

However, the shape of the first pixel electrode 191a and the second pixel electrode 191b in one pixel of the liquid crystal display according to the invention is not limited thereto, and all shapes of which at least portions of the first pixel electrode 191a and the second pixel electrode 191b are the same and are alternately disposed may be applied.

The first pixel electrode 191a is physically and electrically connected to the first drain electrode 175a through the contact hole 185a, thereby receiving the data voltage from the first drain electrode 175a. Also, the second pixel electrode 191b is physical and electrically connected to the second drain electrode 175b through the contact hole 185b, thereby receiving the first voltage transmitted through the first voltage transmitting line 172 from the second drain electrode 175b. The first sub-pixel electrode 191a and the second sub-pixel electrode 191b form the liquid crystal capacitor Clc along with the liquid crystal layer 3 interposed therebetween to maintain the applied voltage after the first TFT and the second TFT are turned off.

The wide ends of the first drain electrode 175a and the second drain electrode 175b of the first sub-pixel electrode 191a and the second sub-pixel electrode 191b overlap the storage electrodes 133a and 133b via the gate insulating layer 140, thereby forming the first storage capacitor Csta and the second storage capacitor Cstb. The first storage capacitor Csta and the second storage capacitor Cstb reinforce the voltage maintaining capacity of the liquid crystal capacitor Clc.

The lower stem 191a1 of the first pixel electrode 191a is connected to the first connection conductor 135a through the contact hole 186a, and the upper stem 191a3 of the first pixel electrode 191a is connected to the first connection conductor 135a through the contact hole 186b, thereby receiving the data voltage from the first drain electrode 175a.

The lower stem 191b1 of the second pixel electrode 191b is connected to the second connection conductor 135b through the contact hole 187a, and the upper stem 191b3 of the second pixel electrode 191b is connected to the third connection conductor 135c through the contact hole 187b, thereby receiving the first voltage from the second drain electrode 175b. The connection member 193 is connected to the second source electrode 173b through the contact hole 188 such that the connection member 193 transmits the first voltage of the first voltage transmitting line 172 to the adjacent pixels.

A lower alignment layer (not shown) may be on an inner surface of the display panel 100, and the lower alignment layer may be a vertical alignment layer. Although not shown, a polymer layer may be on the lower alignment layer, and the polymer layer may include a polymer branch that is formed according to an initial alignment direction of the liquid crystal molecules 31. In an exemplary embodiment, the polymer layer may be formed by exposing and polymerizing a prepolymer such as a monomer, that is hardened by polymerization with light such as ultraviolet rays, and the alignment force of the liquid crystal molecules may be controlled according to the polymer branch.

Next, the upper panel 200 will be described.

A light blocking member 220 is on a second insulation substrate 210 including transparent glass or plastic. The light blocking member 220 prevents light leakage between the pixel electrodes 191 and defines an opening region that faces the pixel electrodes 191.

A plurality of color filters 230 are on the second insulation substrate 210 and the light blocking member 220. The color filters 230 mostly exist within the area surrounded by the light blocking member 220, and may longitudinally extend along the columns of the pixel electrodes 191 in the longitudinal direction. The respective color filters 230 may express one of three primary colors of red, green, and blue or the primary colors of yellow, cyan, magenta. Also, each pixel may represent a mixture color of the primary colors or white as well as the primary colors.

An overcoat 250 is on the color filter 230 and the light blocking member 220. The overcoat 250 may include an inorganic or organic insulator, and reduce or effectively prevents exposure of the color filters 230 and provides a planarized surface. In an alternative exemplary embodiment, the overcoat 250 may be omitted.

An upper alignment layer (not shown) is on the inner surface of the display panel 200, and the upper alignment layer may be a vertical alignment layer. Although not shown, a polymer layer may also be on the upper alignment layer. In an exemplary embodiment, the polymer layer may be formed by exposing a prepolymer such as a monomer, that is hardened by polymerization with light such as ultraviolet rays, such that the alignment force of the liquid crystal molecules may be controlled. The polymer layer may include a polymer branch that is formed according to the initial alignment direction of the liquid crystal molecule.

At least one polarizer (not shown) may be provided on the outer surface of the display panels 100 and 200.

The liquid crystal layer 3 that is disposed between the lower display panel 100 and the upper display panel 200 includes liquid crystal molecules 31 that have positive dielectric anisotropicity, and the liquid crystal molecules 31 may be aligned so that long axes thereof are perpendicular to the surfaces of the two display panels 100 and 200 in a state in which there is no electric field.

If the first pixel electrode 191a and the second pixel electrode 191b are applied with different voltages, an electric field that is almost parallel to the surfaces of the display panels 100 and 200 is generated. Thus, the liquid crystal molecules of the liquid crystal layer 3 that are initially aligned perpendicular to the surfaces of the display panels 100 and 200 are rearranged in response to the electric field such that the long axes thereof are declined parallel to the direction of the electric field. The change degree of the polarization of the light incident to the liquid crystal layer 3 is different according to the declination degree of the liquid crystal molecules. The change of the polarization appears as a change of transmittance by the polarizer, and thereby the liquid crystal display displays the images.

As described above, the liquid crystal molecules 31 that are perpendicularly aligned are used such that the contrast ratio of the liquid crystal display may be improved and a wide viewing angle may be realized.

In addition, since the liquid crystal molecules 31 that have positive dielectric anisotropicity have greater dielectric anisotropicity and a lower rotation viscosity as compared to the liquid crystal molecules 31 that have negative dielectric anisotropicity, it is possible to obtain a rapid response speed.

In addition, in the liquid crystal display according to the illustrated exemplary embodiment, any rubbing step may be not essential such that a contrast ratio increases compared with a TN mode liquid crystal display.

Also, in the liquid crystal display according to the illustrated exemplary embodiment, the branches of the first pixel electrode 191a and the second pixel electrode 191b engage with each other and are alternately disposed, thereby forming a pectinated pattern. With the low gray region L where the interval between the neighboring branches is wide, and with the high gray region H where the interval between the neighboring branches is narrow, the high gray region H is disposed at the center of the pixel area and is enclosed by the low gray region L. It is possible to vary the inclination angle of the liquid crystal molecules 31 of the liquid crystal layer 3 and display different luminance with respect to one image information set by varying the interval between the first pixel electrodes 191a and the second pixel electrodes 191b in one pixel. Further, it is possible to maximally make an image viewed from the side of the liquid crystal display closer to an image viewed from the front of the liquid crystal display by properly adjusting the interval between the branches of the first pixel electrode 191a and the second pixel electrode 191b. Therefore, it is possible to improve side visibility and enhance transmittance.

Also, since the liquid crystal display according to the illustrated exemplary embodiment includes the low gray region L and the high gray region H where the intervals between the branches of the first pixel electrode 191a and the second pixel electrode 191b are different, it is possible to make an image viewed from the side of the liquid crystal display closer to an image viewed from the front of the liquid crystal display to the maximum. Therefore, it is possible to improve side visibility and enhance transmittance.

A portion of the low gray region L is disposed in the portion A that is not enclosed by the stems 191a1, 191a3, 191b1, and 191b3 of the first pixel electrode 191a and the second pixel electrode 191b among the pixel outer portion of the liquid crystal display according to the illustrated exemplary embodiment such that the region where the magnitude of the horizontal electric field between the first pixel electrode 191a and the second pixel electrode 191b is relatively weak is disposed. Accordingly, the display quality deterioration that can be generated by the asymmetry of the direction of the horizontal electric field between the first pixel electrode 191a and the second pixel electrode 191b such as texture, may be reduced.

Figure 6:
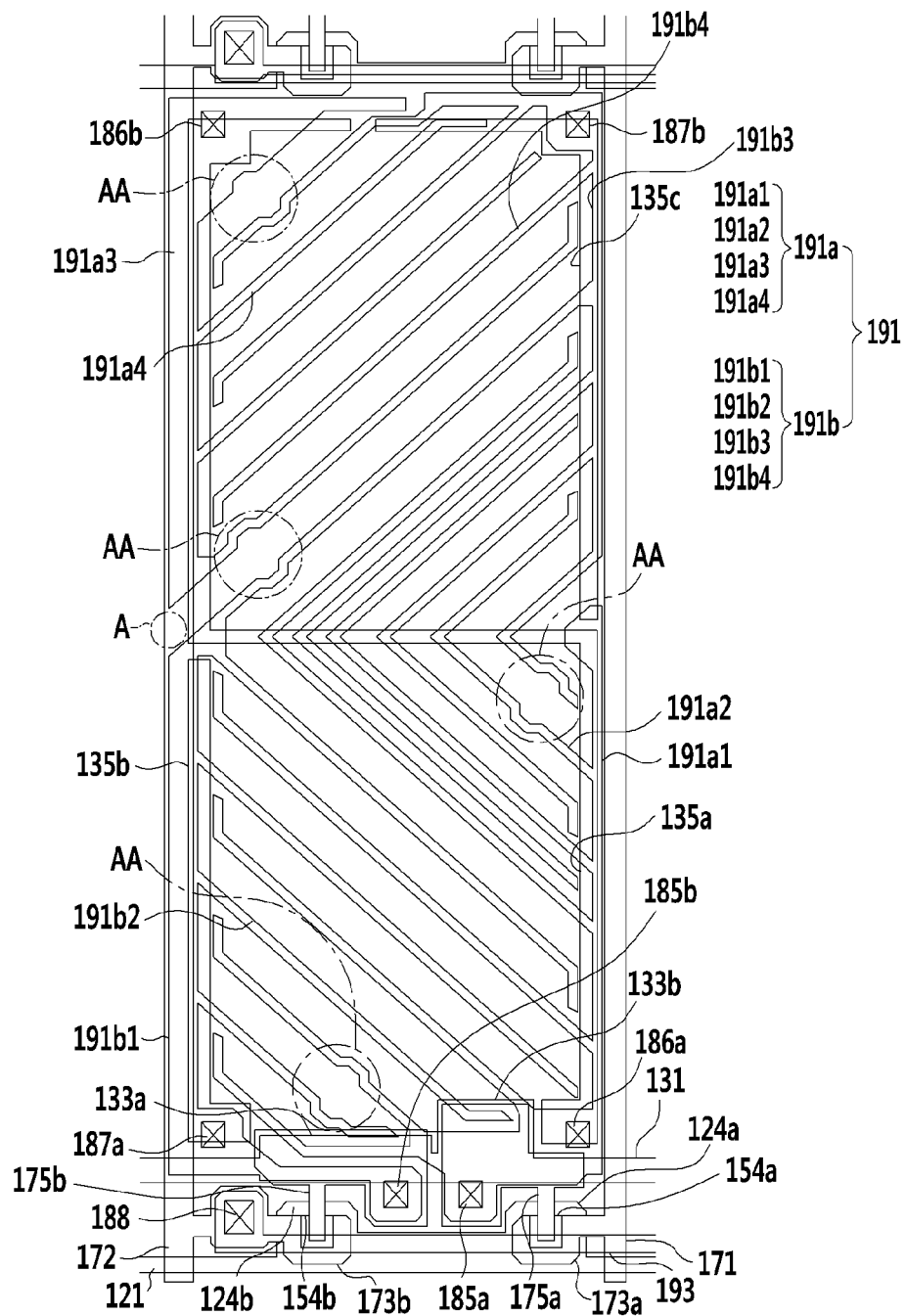
FIG. 6 is a plan view of another exemplary embodiment of a liquid crystal display according to the invention.

Next, another exemplary embodiment of a liquid crystal display according to the invention will be described with reference to FIG. 6. FIG. 6 is a plan view of another exemplary embodiment of a liquid crystal display according to the invention.

Referring to FIG. 6, the liquid crystal display is similar to the liquid crystal display according to the exemplary embodiment in FIG. 4 and FIG. 5.

One pixel electrode 191 includes the first sub-pixel electrode 191a and the second sub-pixel electrode 191b, the entire outer shape of one pixel electrode 191 is a quadrangle, and the first pixel electrode 191a and the second pixel electrode 191b engage with each other. The first pixel electrode 191a and the second pixel electrode 191b are symmetrical with respect to the imaginary transverse central line of the pixel electrode 191, and are respectively divided into the two sub-regions, such as the upper sub-region and the lower sub-region.

The first pixel electrode 191a includes a lower stem 191a1 and an upper stem 191a3, and a plurality of the first branches 191a2 and a plurality of the second branches 191a4 extending from the lower stem 191a1 and the upper stem 191a3, respectively. The second pixel electrode 191b includes a lower stem 191b1 and an upper stem 191b3, and a plurality of the third branches 191b2 and a plurality of the fourth branches 191b4 extending from the lower stem 191b1 and the upper stem 191b3, respectively.

The lower stem 191a1 and the upper stem 191a3 of the first pixel electrode 191a are disposed on the right side and the left side of one pixel electrode, and the lower stem 191b1 and the upper stem 191b3 of the second pixel electrode 191b are disposed on the left side and the right side of the one pixel electrode, respectively.

By this, the magnitude of the parasitic capacitance formed by overlapping the data line 171 and the first voltage transmitting line 172 that are disposed on the left side and the right side of the one pixel electrode and the pixel electrode 191 may be formed to be symmetrical on the left side and the right side of the pixel electrode 191, such that the magnitudes of the parasitic capacitances between the first pixel electrode 191a and the second pixel electrode 191b, and the two left and right signal lines, may be the same. As a result, crosstalk deterioration generated by the deviation of the right and left parasitic capacitances may be reduced or effectively prevented.

The angle of the plurality of branches 191a2, 191a4, 191b2, and 191b4 of the first pixel electrode 191a and the second pixel electrode 191b with respect to the transverse center line, may be about 45 degrees.

The branches 191a2, 191a4, 191b2, and 191b4 of the first pixel electrode 191a and the second pixel electrode 191b engage with each other with a predetermined interval therebetween and are alternately disposed, thereby forming a pectinated pattern. In one exemplary embodiment, the interval between the branches 191a2, 191a4, 191b2, and 191b4 of the first pixel electrode 191a and the second pixel electrode 191b is preferably within about 30 μm.

The branches 191a2, 191a4, 191b2, and 191b4 of the first pixel electrode 191a and the second pixel electrode 191b engage with each other and are alternately disposed, thereby forming a pectinated pattern. The low gray region L where the interval between the neighboring branches is wide, and the high gray region H where the interval between the neighboring branches is narrow exists in one pixel. The high gray region H is disposed substantially at the center of the pixel area and is enclosed by the low gray region L. It is possible to vary the inclination angle of the liquid crystal molecules 31 of the liquid crystal layer 3 and display different luminance with respect to one image information set by varying the interval between the first pixel electrodes 191a and the second pixel electrodes 191b in one pixel. Further, it is possible to maximally make an image viewed from the side of the liquid crystal display closer to an image viewed from the front of the liquid crystal display by properly adjusting the interval between the branches of the first pixel electrode 191a and the second pixel electrode 191b. Therefore, it is possible to improve side visibility and enhance transmittance.

The low gray region L is dispose in portion A that is not enclosed by the stems 191a1, 191a3, 191b1, and 191b3 of the first pixel electrode 191a and the second pixel electrode 191b among the pixel outer portion of the liquid crystal display according to the illustrated exemplary embodiment, such that the region where the magnitude of the horizontal electric field between the first pixel electrode 191a and the second pixel electrode 191b is relatively weak is disposed. Accordingly, the display quality deterioration that can be generated by the asymmetry of the direction of the horizontal electric field between the first pixel electrode 191a and the second pixel electrode 191b such as texture, may be reduced.

However, differently from the liquid crystal display in the exemplary embodiment of FIG. 4 and FIG. 5, the liquid crystal display according to the illustrated exemplary embodiment has an extension region AA where the intervals between portions of the branches 191a2 and 191a4 of the first pixel electrode 191a, and between portions of the branches 191b2 and 191b4 of the second pixel electrode 191b are expanded. The intervals between the portions of the branches 191a2 and 191a4 of the first pixel electrode 191a, and between the portions of the branches 191b2 and 191b4 of the second pixel electrode 191b in the extension region AA may be about 20 μm to about 28 μm.

Here, the intervals between the branches 191a2 and 191a4 of the first pixel electrode 191a and the branches 191b2 and 191b4 of the second pixel electrode 191b in the extension region AA are wider than intervals between remaining portions of the branches 191a2 and 191a4 and between remaining portions of the branches 191b2 and 191b4 such that the liquid crystal molecules may not be affected by the irregular horizontal electric field, however the transmittance of the liquid crystal display may be reduced. Accordingly, the intervals between the portions of the branches 191a2 and 191a4 of the first pixel electrode 191a and between the portions of the branches 191b2 and 191b4 of the second pixel electrode 191b in the extension region AA may be changed by considering the transmittance of the liquid crystal display as well as the rotation degree of the liquid crystal molecules according to the horizontal electric field. In the illustrated exemplary embodiment, the extension region AA is disposed at a position where the liquid crystal molecules are irregularly moved in the pixel area, such as near a portion of the pixel area that is not enclosed by the stems 191a1, 191a3, 191b1, and 191b3 of the first pixel electrode 191a and the second pixel electrode 191b among the pixel outer portion of the liquid crystal display or the gate line 121.

By the above-described structure, the liquid crystal molecules 31 disposed at the extension region AA are relatively weak with regard to the influence of the horizontal electric field that is formed between the branches 191a2 and 191a4 of the first pixel electrode 191a, and between the branches 191b2 and 191b4 of the second pixel electrode 191b. Accordingly, the liquid crystal molecules 31 disposed at the extension region AA are less influenced by the asymmetrical horizontal electric field, and the liquid crystal molecules 31 have a large capacity to maintain the vertical alignment state that is the initial alignment state, such that irregular slanting of the liquid crystal molecules 31 by the external pressure may be reduced or effectively prevented. Accordingly, the irregular movement of the liquid crystal molecules 31 being diffused from the outer part of the pixel area to the inner part of the pixel area is reduced or effectively prevented, and a singular point limited in the extension region AA is formed such that a large-sized display quality deterioration that flows from the outer part of the pixel area to the inner part of the pixel area may be prevented.

All characteristics of the exemplary embodiment of the liquid crystal display according to the invention that is shown in FIG. 4 and FIG. 5 may be applied to all liquid crystal displays according to the illustrated exemplary embodiment.

Figure 7A:
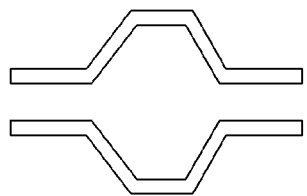
FIG. 7A to FIG. 7D are views showing exemplary embodiments of a portion of a liquid crystal display according to the invention.
Figure 7B:
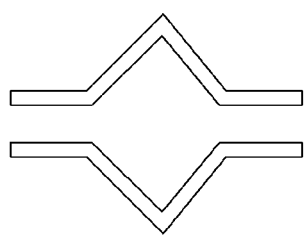
Figure 7C:
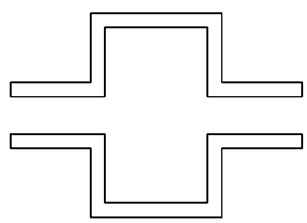

The shape of the extension region AA of the liquid crystal display according to the illustrated exemplary embodiment will be described with reference to FIG. 7A to FIG. 7C. FIG. 7A to FIG. 7C are views showing exemplary embodiments of shapes of an extension region AA of a liquid crystal display according to the invention.

Referring to FIG. 7A, the branches of the pixel electrode forming the extension region AA have a trapezoid shape such that the extension region AA may be hexagonal in the plan view.

Referring to FIG. 7B, the branches of the pixel electrode forming the extension region AA have a triangular shape such that the extension region AA may be rhomboidal in the plan view.

Referring to FIG. 7C, the branches of the pixel electrode forming the extension region AA have a quadrangle shape such that the extension region AA may be quadrangular in the plan view.

Figure 7D:
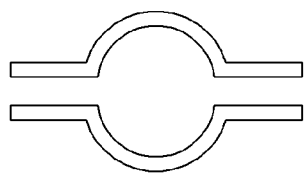

Referring to FIG. 7D, the branches of the pixel electrode forming the extension region AA have a semi-circular shape such that the extension region AA may be circular in the plan view.

However, the shape of the extension region AA is not limited thereto, and all shapes where the interval of the branches of the pixel electrode is wide compared with the adjacent intervals are possible.

Figure 8:
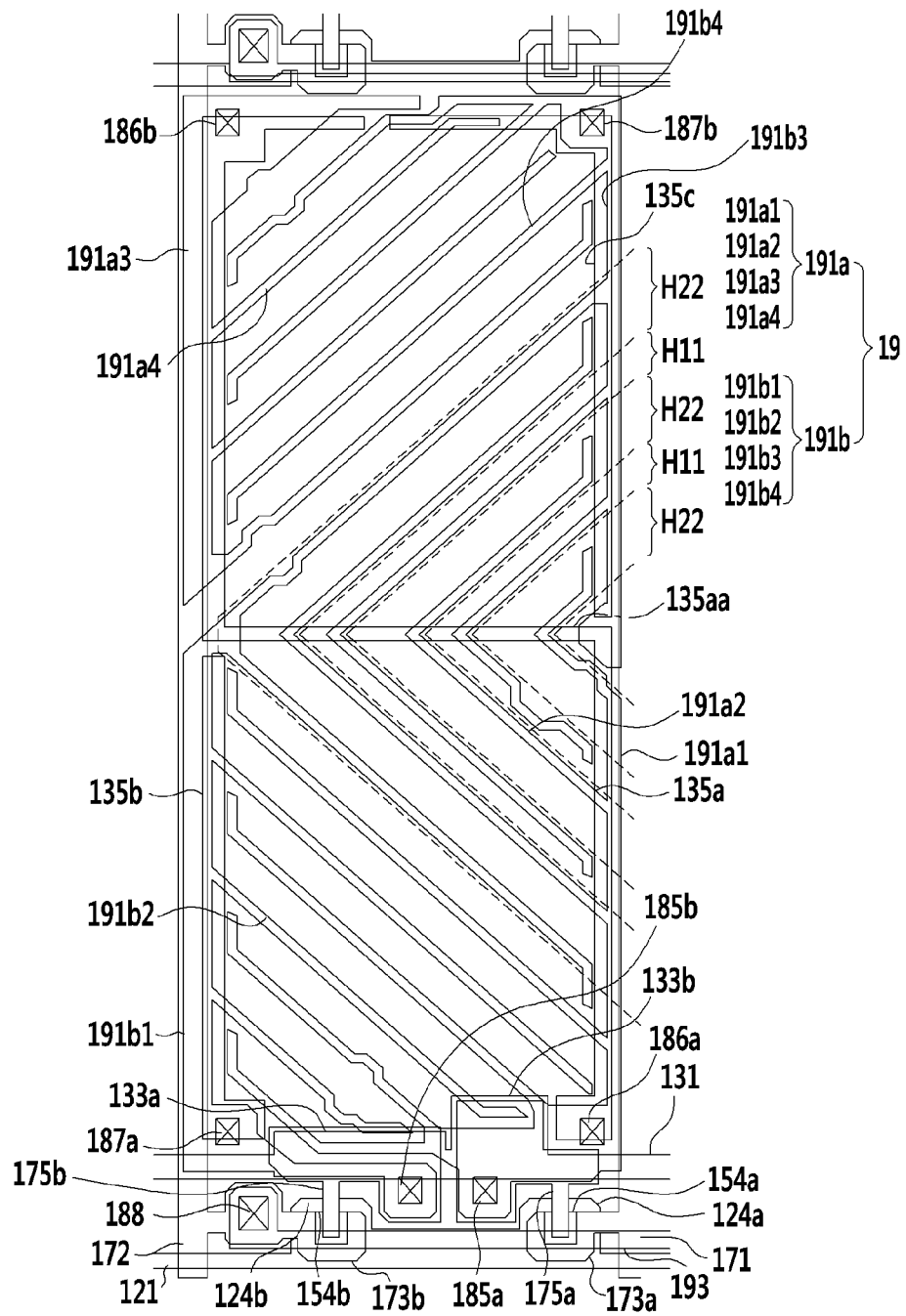
FIG. 8 is a plan view of another exemplary embodiment of a liquid crystal display according to the invention.

Next, another exemplary embodiment of a liquid crystal display according to the invention will be described with reference to FIG. 8. FIG. 8 is a plan view of another exemplary embodiment of a liquid crystal display according to the invention.

Referring to FIG. 8, the liquid crystal display is similar to the liquid crystal display according to the above-described exemplary embodiments.

One pixel electrode 191 includes the first sub-pixel electrode 191a and the second sub-pixel electrode 191b, the entire outer shape of one pixel electrode 191 is a quadrangle, and the first pixel electrode 191a and the second pixel electrode 191b engage with each other. The first pixel electrode 191a and the second pixel electrode 191b are symmetrical with respect to the imaginary transverse central line of the pixel electrode 191, and are respectively divided into the two sub-regions, such as the upper sub-region and the lower sub-region.

The first pixel electrode 191a includes a lower stem 191a1 and an upper stem 191a3, and a plurality of the first branches 191a2 and a plurality of the second branches 191a4 extending from the lower stem 191a1 and the upper stem 191a3, respectively. The second pixel electrode 191b includes a lower stem 191b1 and an upper stem 191b3, and a plurality of the third branches 191b2 and a plurality of the fourth branches 191b4 extending from the lower stem 191b1 and the upper stem 191b3, respectively.

The lower stem 191a1 and the upper stem 191a3 of the first pixel electrode 191a are disposed on the right side and the left side of one pixel electrode, and the lower stem 191b1 and the upper stem 191b3 of the second pixel electrode 191b are disposed on the left side and the right side of the one pixel electrode, respectively.

By this, the magnitude of the parasitic capacitance formed by overlapping the data line 171 and the first voltage transmitting line 172 that are disposed on the left side and the right side of the one pixel electrode and the pixel electrode 191 may be formed to be symmetrical on the left side and the right side of the pixel electrode 191, such that the magnitudes of the parasitic capacitances between the first pixel electrode 191a and the second pixel electrode 191b, and the two left and right signal lines, may be the same. As a result, crosstalk deterioration generated by the deviation of the right and left parasitic capacitances may be reduced or effectively prevented.

The angle of the plurality of branches 191a2, 191a4, 191b2, and 191b4 of the first pixel electrode 191a and the second pixel electrode 191b with respect to the transverse center line, may be about 45 degrees.

The branches 191a2, 191a4, 191b2, and 191b4 of the first pixel electrode 191a and the second pixel electrode 191b engage with each other with a predetermined interval therebetween and are alternately disposed, thereby forming a pectinated pattern. In one exemplary embodiment, the interval between the branches 191a2, 191a4, 191b2, and 191b4 of the first pixel electrode 191a and the second pixel electrode 191b is within about 30 μm.

A portion of the low gray region L is disposed in the portion A that is not enclosed by the stems 191a1, 191a3, 191b1, and 191b3 of the first pixel electrode 191a and the second pixel electrode 191b among the pixel outer portion of the liquid crystal display according to the illustrated exemplary embodiment, such that the region where the magnitude of the horizontal electric field between the first pixel electrode 191a and the second pixel electrode 191b is relatively weak is disposed. Accordingly, the display quality deterioration that can be generated by the asymmetry of the direction of the horizontal electric field between the first pixel electrode 191a and the second pixel electrode 191b such as texture, may be reduced.

However, the positions of the high gray regions H11 where the interval between the neighboring branches is narrow are different from that of the above-described exemplary embodiments of a liquid crystal display, in the liquid crystal display according to the illustrated exemplary embodiment.

In detail, the first connection conductor 135a connects the lower stem 191a1 and the upper stem 191a3 of the first pixel electrode 191a to transmit the data voltage applied to the first pixel electrode 191a. The first connection conductor 135a is applied with a voltage having the same polarity as a signal applied to the first pixel electrode. The first connection conductor 135a comprised a portion 135aa disposed at the center of the pixel area.

In H11, the interval between the branches 191a2 of the first pixel electrode 191a and the neighboring branches 191b4 of the second pixel electrode 191b is narrow Also, in H22, the interval between the branches 191a2 of the first pixel electrode 191a and the neighboring branches 191b4 of the second pixel electrode 191b is wide.

In H11, the branches 191a2 of the first pixel electrode 191a make the obtuse angle with the portion 135aa disposed at the center of the pixel area among the first connection conductor 135a and the branches 191b4 of the second pixel electrode 191b make the acute angle with the portion 135aa.

In H22, the branches 191a2 of the first pixel electrode 191a make the acute angle with the portion 135aa disposed at the center of the pixel area among the first connection conductor 135a and the branches 191b4 of the second pixel electrode 191b make the obtuse angle with the portion 135aa.

As described above, in the portion 135aa disposed at the center of the pixel area among the first connection conductor 135a connecting the first stem 191a1 and the second stem 191a3 of the first pixel electrode 191a and the portion making the acute angle along with the branches 191a2 of the first pixel electrode 191a applied with the voltage having the same polarity, the interval between the branches of the first pixel electrode 191a and the branches 191b4 of the neighboring second pixel electrode 191b is narrow, and thereby the irregular movement of the liquid crystal molecule is prevented in the portion 135aa disposed at the center of the pixel area among the first connection conductor 135a applied with the same polarity voltage and the portion making the acute angle along with the branches of the first pixel electrode 191a, and resultantly the display quality deterioration may be prevented.

Also, similar to the liquid crystal display of the above-described exemplary embodiment, in the liquid crystal display according to the illustrated exemplary embodiment, the high gray regions H11 are disposed at the center of the pixel area and are enclosed by the low gray region where the interval between the first pixel electrode 191a and the second pixel electrode 191b is relatively wide. It is possible to vary the inclination angle of the liquid crystal molecules 31 of the liquid crystal layer 3 and display different luminance with respect to one image information set by varying the interval between the first pixel electrodes 191a and the second pixel electrodes 191b in one pixel. Further, it is possible to maximally make an image viewed from the side of the liquid crystal display closer to an image viewed from the front of the liquid crystal display by properly adjusting the interval between the branches of the first pixel electrode 191a and the second pixel electrode 191b. Therefore, it is possible to improve side visibility and enhance transmittance.

Also, like the liquid crystal display of the above-described exemplary embodiment, the liquid crystal display according to the illustrated exemplary embodiment may have the extension region where the interval between the branches 191a2 and 191a4 of the first pixel electrode 191a and the branches 191b2 and 191b4 of the second pixel electrode 191b are extended. The interval between the branches 191a2 and 191a4 of the first pixel electrode 191a and the branches 191b2 and 191b4 of the second pixel electrode 191b in the extension region may be about 20 μm to about 28 μm.

By this, the liquid crystal molecules 31 disposed at the extension region AA are relatively weak with regard to the influence of the horizontal electric field that is formed between the branches 191a2 and 191a4 of the first pixel electrode 191a, and between the branches 191b2 and 191b4 of the second pixel electrode 191b. Accordingly, the liquid crystal molecules 31 disposed at the extension region AA are less influenced by the asymmetrical horizontal electric field, and the liquid crystal molecules 31 have the large capacity to maintain the vertical alignment state that is the initial alignment state such that irregular slanting of the liquid crystal molecules 31 by the external pressure may be reduced or effectively prevented. Accordingly, the irregular movement of the liquid crystal molecules being diffused from the outer part of the pixel area to the inner part of the pixel area is reduced or effectively prevented, and the singular point limited in the extension region AA is formed such that the large-sized display quality deterioration that flows from the outer part of the pixel area to the inner part of the pixel area may be reduced or effectively prevented.

All characteristics of the exemplary embodiment of the liquid crystal display according to the invention that is shown in FIG. 4, FIG. 5, and FIG. 6 may be applied to all liquid crystal displays according to the illustrated exemplary embodiment.

Figure 9:
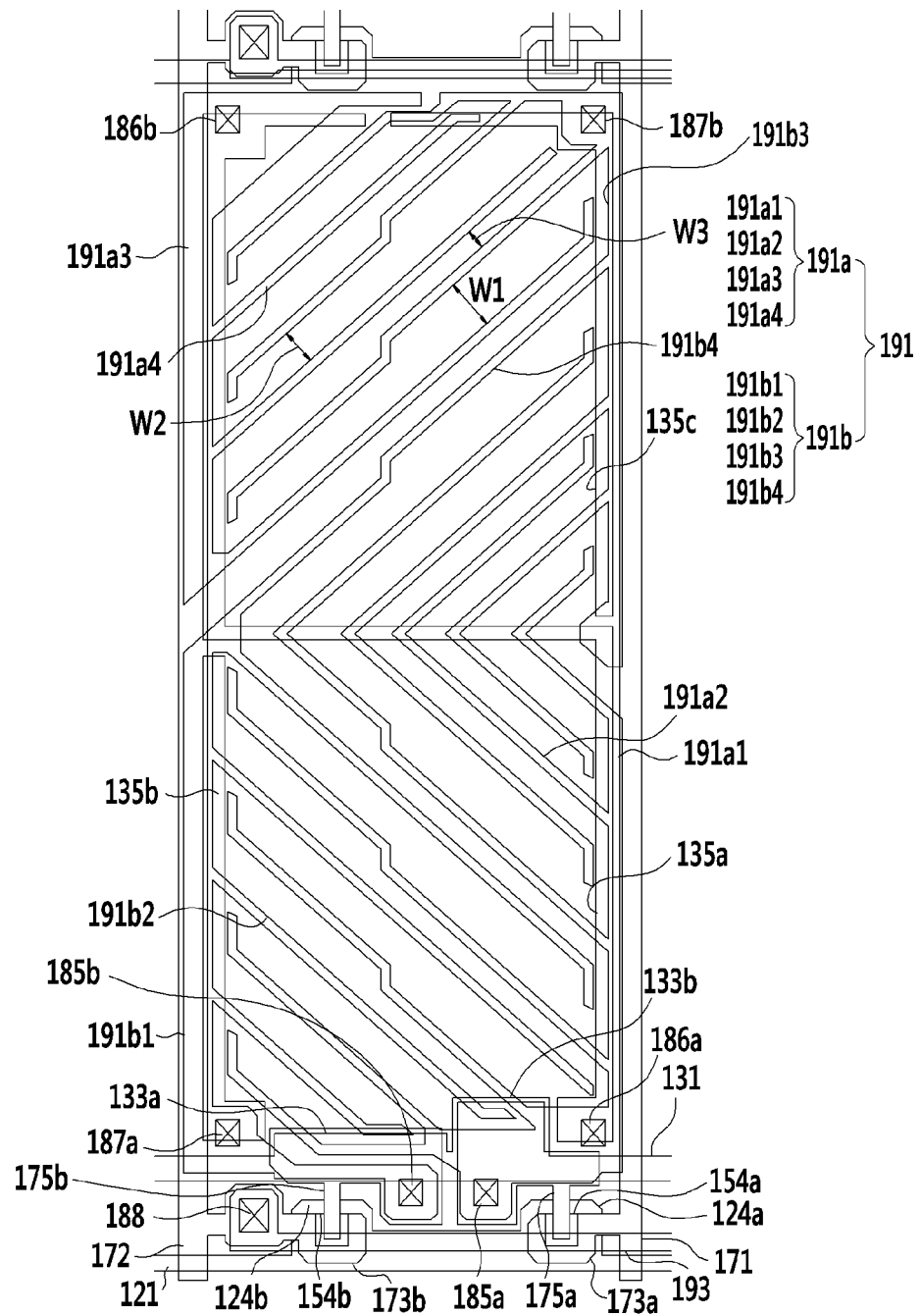
FIG. 9 is a plan view of another exemplary embodiment of a liquid crystal display according to the invention.

Next, another exemplary embodiment of a liquid crystal display according to the invention will be described with reference to FIG. 9. FIG. 9 is a plan view of another exemplary embodiment of a liquid crystal display according to the invention.

Referring to FIG. 9, the liquid crystal display is similar to the liquid crystal display according to the above-described exemplary embodiments.

One pixel electrode 191 includes the first sub-pixel electrode 191a and the second sub-pixel electrode 191b, the entire outer shape of one pixel electrode 191 is a quadrangle, and the first pixel electrode 191a and the second pixel electrode 191b engage with each other. The first pixel electrode 191a and the second pixel electrode 191b are symmetrical with respect to the imaginary transverse central line of the pixel electrode 191, and are respectively divided into the two sub-regions, such as the upper sub-region and the lower sub-region.

The first pixel electrode 191a includes a lower stem 191a1 and an upper stem 191a3, and a plurality of the first branches 191a2 and a plurality of the second branches 191a4 extending from the lower stem 191a1 and the upper stem 191a3, respectively. The second pixel electrode 191b includes a lower stem 191b1 and an upper stem 191b3, and a plurality of the third branches 191b2 and a plurality of the fourth branches 191b4 extending from the lower stem 191b1 and the upper stem 191b3, respectively.

The lower stem 191a1 and the upper stem 191a3 of the first pixel electrode 191a are disposed on the right side and the left side of one pixel electrode, and the lower stem 191b1 and the upper stem 191b3 of the second pixel electrode 191b are disposed on the left side and the right side of the one pixel electrode, respectively.

By this, the magnitude of the parasitic capacitance formed by overlapping the data line 171 and the first voltage transmitting line 172 that are disposed on the left side and the right side of the one pixel electrode and the pixel electrode 191 may be formed to be symmetrical on the left side and the right side of the pixel electrode 191, such that the magnitudes of the parasitic capacitances between the first pixel electrode 191a and the second pixel electrode 191b, and the two left and right signal lines, may be the same. As a result, crosstalk deterioration generated by the deviation of the right and left parasitic capacitances may be reduced or effectively prevented.

The angle of the plurality of branches 191a2, 191a4, 191b2, and 191b4 of the first pixel electrode 191a and the second pixel electrode 191b with respect to the transverse center line, may be about 45 degrees.

The branches 191a2, 191a4, 191b2, and 191b4 of the first pixel electrode 191a and the second pixel electrode 191b engage with each other with a predetermined interval therebetween and are alternately disposed, thereby forming a pectinated pattern.

However, differently from the liquid crystal display in the above-described exemplary embodiment, the liquid crystal display according to the illustrated exemplary embodiment includes regions where the interval between neighboring branches of the first pixel electrode 191*a* and second pixel electrode 191*b* respectively form a first interval W1, a second interval W2, and a third interval W3, respectively. Like this, the low gray region where the interval between the neighboring branches of the first pixel electrode 191*a* and the second pixel electrode 191*b* is wide, and the high gray region where the interval between the neighboring branches is narrow are not divided. The regions having at least three intervals W1, W2, and W3 that are different between the neighboring branches of the first pixel electrode 191*a* and the second pixel electrode 191*b* are formed such that it is possible to vary the inclination angle of the liquid crystal molecules 31 of the liquid crystal layer 3 in at least three regions, and display different luminance with respect to one image information set by varying the interval between the first pixel electrodes 191*a* and the second pixel electrodes 191*b* in one pixel. Accordingly, the steep change of the luminance according to the gray change of the liquid crystal display may be reduced, and thereby it is possible to express natural grays, and resultantly the display quality of the liquid crystal display may be increased.

Also, in the liquid crystal display according to the illustrated exemplary embodiment, like the liquid crystal display according to the above-described exemplary embodiments, the low gray region is disposed in the portion that is not enclosed by the stems 191*a*1, 191*a*3, 191*b*1, and 191*b*3 of the first pixel electrode 191*a* and the second pixel electrode 191*b* among the pixel outer portion such that the region where the magnitude of the horizontal electric field between the first pixel electrode 191*a* and the second pixel electrode 191*b* is relatively weak is disposed. Accordingly, the display quality deterioration that can be generated by the asymmetry of the direction of the horizontal electric field between the first pixel electrode 191*a* and the second pixel electrode 191*b* such as texture, may be reduced.

All characteristics of the exemplary embodiment of liquid crystal display according to the invention that is shown in FIG. 4, FIG. 5, FIG. 6, and FIG. 8 may be applied to all liquid crystal displays according to the illustrated exemplary embodiment.

Figure 10:
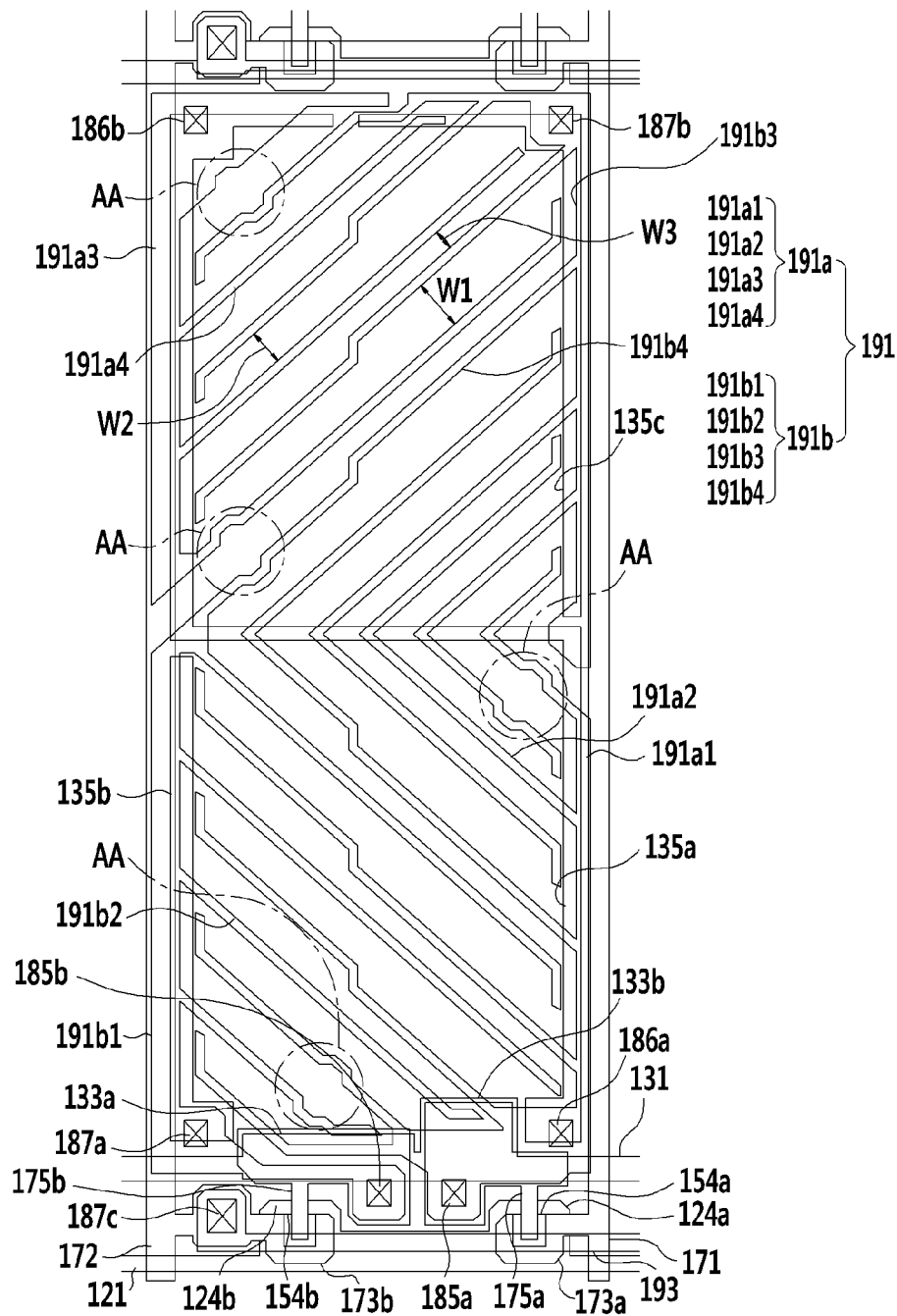
FIG. 10 is a plan view of another exemplary embodiment of a liquid crystal display according to an exemplary embodiment of the invention.

Next, another exemplary embodiment of a liquid crystal display according to the invention will be described with reference to FIG. 10. FIG. 10 is a plan view of another exemplary embodiment of a liquid crystal display according to the invention.

Referring to FIG. 10, the liquid crystal display is similar to the liquid crystal display according to the above-described exemplary embodiments.

One pixel electrode 191 includes the first sub-pixel electrode 191*a* and the second sub-pixel electrode 191*b*, the entire outer shape of one pixel electrode 191 is a quadrangle, and the first pixel electrode 191*a* and the second pixel electrode 191*b* engage with each other. The first pixel electrode 191*a* and the second pixel electrode 191*b* are symmetrical with respect to the imaginary transverse central line of the pixel electrode 191, and are respectively divided into the two sub-regions, such as the upper and lower sub-region.

The first pixel electrode 191*a* includes a lower stem 191*a*1 and an upper stem 191*a*3, and a plurality of the first branches 191*a*2 and a plurality of the second branches 191*a*4 extending from the lower stem 191*a*1 and the upper stem 191*a*3, respectively. The second pixel electrode 191*b* includes a lower stem 191*b*1 and an upper stem 191*b*3, and a plurality of the third branches 191*b*2 and a plurality of the fourth branches 191*b*4 extending from the lower stem 191*b*1 and the upper stem 191*b*3, respectively.

The lower stem 191*a*1 and the upper stem 191*a*3 of the first pixel electrode 191*a* are disposed on the right side and the left side of one pixel electrode, and the lower stem 191*b*1 and the upper stem 191*b*3 of the second pixel electrode 191*b* are disposed on the left side and the right side of one pixel electrode.

By this, the magnitude of the parasitic capacitance formed by overlapping the data line 171 and the first voltage transmitting line 172 that are disposed on the left side and the right side of the one pixel electrode and the pixel electrode 191 may be formed to be symmetrical on the left side and the right side of the pixel electrode such that the magnitudes of the parasitic capacitances between the first pixel electrode 191*a* and the second pixel electrode 191*b*, and the two left and right signal lines may be the same. As a result, crosstalk deterioration generated by the deviation of the right and left parasitic capacitances may be reduced or effectively prevented.

The angle of the plurality of branches 191*a*2, 191*a*4, 191*b*2, and 191*b*4 of the first pixel electrode 191*a* and the second pixel electrode 191*b* with respect to the transverse center line, may be about 45 degrees.

The branches 191*a*2, 191*a*4, 191*b*2, and 191*b*4 of the first pixel electrode 191*a* and the second pixel electrode 191*b* engage with each other with a predetermined interval therebetween and are alternately disposed, thereby forming a pectinated pattern.

The liquid crystal display according to the illustrated exemplary embodiment includes regions where the interval between the neighboring branches of the first pixel electrode 191*a* and second pixel electrode 191*b* respectively form the first interval W1, the second interval W2, and the third interval W3. Like this, the low gray region where the interval between the neighboring branches of the first pixel electrode 191*a* and the second pixel electrode 191*b* is wide, and the high gray region where the interval between the neighboring branches is narrow are not divided. The regions having at least three intervals W1, W2, and W3 that are different between the neighboring branches of the first pixel electrode 191*a* and the second pixel electrode 191*b* are formed such that it is possible to vary the inclination angle of the liquid crystal molecules 31 of the liquid crystal layer 3 in at least three regions, and display different luminance with respect to one image information set by varying the interval between the first pixel electrodes 191*a* and the second pixel electrodes 191*b* in one pixel. Accordingly, the visibility of the liquid crystal display may be increased and the display quality of the liquid crystal display may be increased.

Also, in the liquid crystal display according to the illustrated exemplary embodiment, like the liquid crystal display according to the above-described exemplary embodiments, the low gray region is disposed in the portion that is not enclosed by the stems 191*a*1, 191*a*3, 191*b*1, and 191*b*3 of the first pixel electrode 191*a* and the second pixel electrode 191*b* among the pixel outer portion such that the region where the magnitude of the horizontal electric field between the first pixel electrode 191*a* and the second pixel electrode 191*b* is relatively weak is disposed. Accordingly, the display quality deterioration that can be generated by the asymmetry of the direction of the horizontal electric field between the first pixel electrode 191*a* and the second pixel electrode 191*b* such as texture, may be reduced.

Also, like the liquid crystal display according to the above-described exemplary embodiment, the liquid crystal display according to the illustrated exemplary embodiment may have the extension region AA where the interval between the branches 191*a*2 and 191*a*4 of the first pixel electrode 191*a* and the branches 191*b*2 and 191*b*4 of the second pixel electrode 191b are extended. The interval between the branches 191a2 and 191a4 of the first pixel electrode 191a and the branches 191b2 and 191b4 of the second pixel electrode 191b in the extension region AA may be about 20 μm to about 28 μm.

By this, the liquid crystal molecules 31 disposed at the extension region AA are relatively weak for the influence of the horizontal electric field that is formed between the branches 191a2 and 191a4 of the first pixel electrode 191a and the branches 191b2 and 191b4 of the second pixel electrode 191b. Accordingly, the liquid crystal molecules 31 disposed at the extension region AA are less influenced by the asymmetrical horizontal electric field, and the liquid crystal molecules 31 have the large capacity to maintain the vertical alignment state that is the initial alignment state such that irregular slanting of the liquid crystal molecules by the external pressure may be reduced or effectively prevented. Accordingly, the irregular movement of the liquid crystal molecules being diffused from the outer part of the pixel area to the inner part of the pixel area is reduced or effectively prevented, and the singular point limited in the extension region AA is formed such that the large-sized display quality deterioration that flows from the outer part of the pixel area to the inner part of the pixel area may be reduced or effectively prevented.

All characteristics of the exemplary embodiment of the liquid crystal display according to the invention that is shown in FIG. 4, FIG. 5, FIG. 6, FIG. 8, and FIG. 9 may be applied to all liquid crystal displays according to the illustrated exemplary embodiment.

Figure 11:
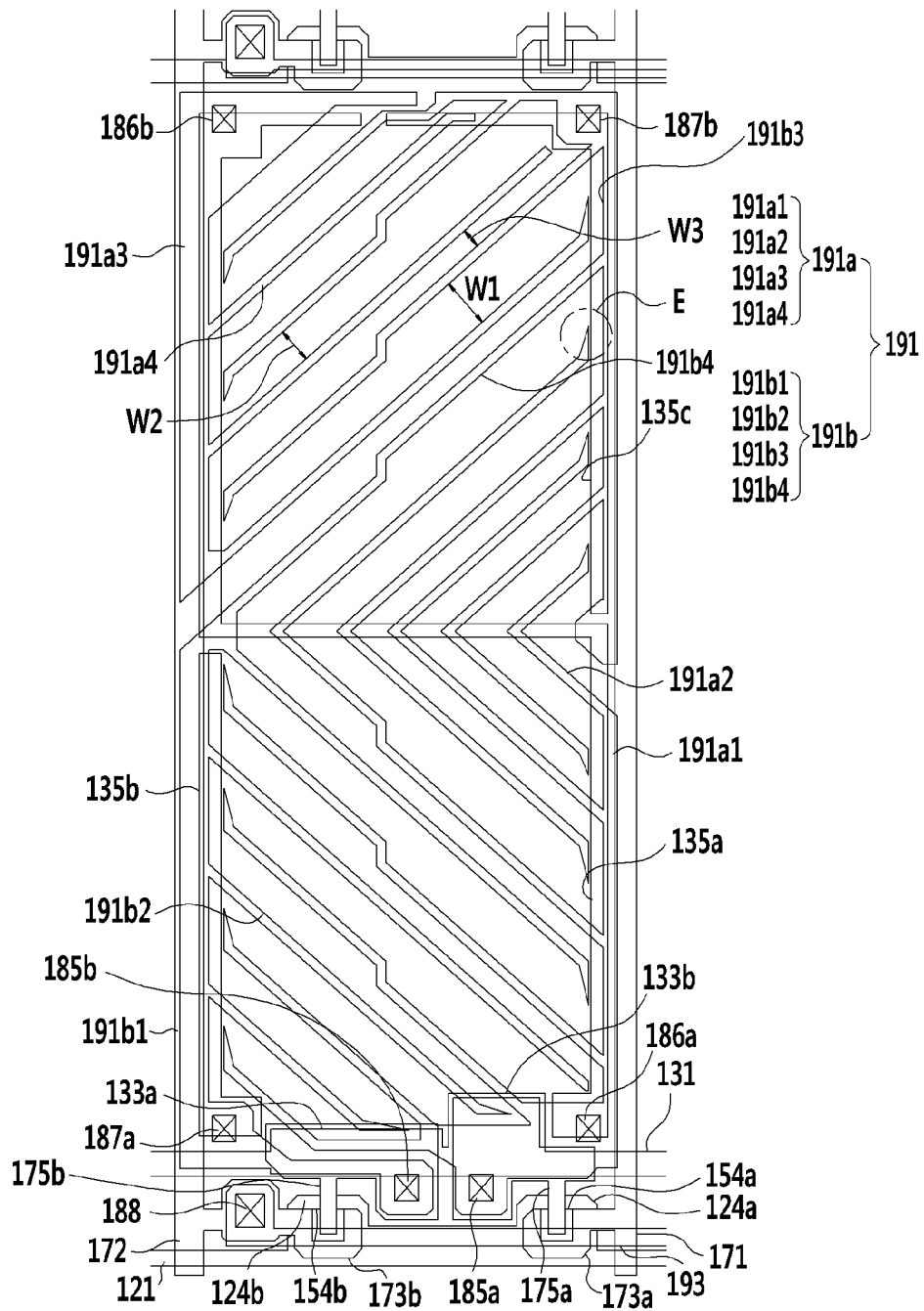
FIG. 11 is a plan view of another exemplary embodiment of a liquid crystal display according to the invention.

Next, another exemplary embodiment of a liquid crystal display according to the invention will be described with reference to FIG. 11. FIG. 11 is a plan view of another exemplary embodiment of a liquid crystal display according to the invention.

Referring to FIG. 11, the liquid crystal display is similar to the liquid crystal display according to the above described exemplary embodiments.

One pixel electrode 191 includes the first sub-pixel electrode 191a and the second sub-pixel electrode 191b, the entire outer shape of one pixel electrode 191 is a quadrangle, and the first pixel electrode 191a and the second pixel electrode 191b engage with each other. The first pixel electrode 191a and the second pixel electrode 191b are symmetrical with respect to the imaginary transverse central line of the pixel electrode 191, and are respectively divided into the two sub-regions, such as the upper sub-region and the lower sub-region.

The first pixel electrode 191a includes a lower stem 191a1 and an upper stem 191a3, and a plurality of the first branches 191a2 and a plurality of the second branches 191a4 extending from the lower stem 191a1 and the upper stem 191a3, respectively. The second pixel electrode 191b includes a lower stem 191b1 and an upper stem 191b3, and a plurality of the third branches 191b2 and a plurality of the fourth branches 191b4 extending from the lower stem 191b1 and the upper stem 191b3, respectively.

The lower stem 191a1 and the upper stem 191a3 of the first pixel electrode 191a are disposed on the right side and the left side of one pixel electrode, and the lower stem 191b1 and the upper stem 191b3 of the second pixel electrode 191b are disposed on the left side and the right side of one pixel electrode.

By this, the magnitude of the parasitic capacitance formed by overlapping the data line 171 and the first voltage transmitting line 172 that are disposed on the left side and the right side of the one pixel electrode and the pixel electrode 191 may be formed to be symmetrical on the left side and the right side of the pixel electrode such that the magnitudes of the parasitic capacitances between the first pixel electrode 191a and the second pixel electrode 191b, and the two left and right signal lines may be the same. As a result, crosstalk deterioration generated by the deviation of the right and left parasitic capacitances may be reduced or effectively prevented.

The angle of the plurality of branches 191a2, 191a4, 191b2, and 191b4 of the first pixel electrode 191a and the second pixel electrode 191b with respect to the transverse center line, may be about 45 degrees.

The branches 191a2, 191a4, 191b2, and 191b4 of the first pixel electrode 191a and the second pixel electrode 191b engage with each other with a predetermined interval therebetween and are alternately disposed, thereby forming a pectinated pattern.

The liquid crystal display according to the illustrated exemplary embodiment includes regions where the interval between the neighboring branches of the first pixel electrode 191a and second pixel electrode 191b respectively form the first interval W1, the second interval W2, and the third interval W3. Like this, the low gray region where the interval between the neighboring branches of the first pixel electrode 191a and the second pixel electrode 191b is wide, and the high gray region where the interval between the neighboring branches is narrow are not divided. The regions having at least three intervals W1, W2, and W3 that are different between the neighboring branches of the first pixel electrode 191a and the second pixel electrode 191b are formed such that It is possible to vary the inclination angle of the liquid crystal molecules 31 of the liquid crystal layer 3 in at least three regions, and display different luminance with respect to one image information set by varying the interval between the first pixel electrodes 191a and the second pixel electrodes 191b in one pixel. By this, the visibility of the liquid crystal display may be increased and the display quality of the liquid crystal display may be increased.

Also, in the liquid crystal display according to the illustrated exemplary embodiment, like the liquid crystal display according to the above-described exemplary embodiments, the low gray region is disposed in the portion that is not enclosed by the stems 191a1, 191a3, 191b1, and 191b3 of the first pixel electrode 191a and the second pixel electrode 191b among the pixel outer portion such that the region where the magnitude of the horizontal electric field between the first pixel electrode 191a and the second pixel electrode 191b is relatively weak is disposed. Accordingly, the display quality deterioration that can be generated by the asymmetry of the direction of the horizontal electric field between the first pixel electrode 191a and the second pixel electrode 191b such as texture, may be reduced.

In the liquid crystal display according to the illustrated exemplary embodiment, the width of the branches is decreased closer to the distal end thereof at the end portion E of the branches 191a2, 191a4, 191b2, and 191b4 of the pixel electrodes 191a and 191b. This is further described with reference to FIG. 12.

Figure 12:
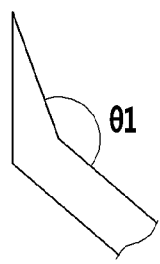
FIG. 12 is a view showing exemplary embodiments of a portion of a liquid crystal display according to the invention.
Figure 12:
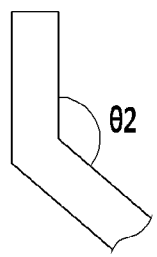

Referring to FIG. 12, FIG. 12 (a) shows the end portion E of the branches 191a2, 191a4, 191b2, and 191b4 of the pixel electrodes 191a and 191b of the liquid crystal display according to the illustrated exemplary embodiment, and FIG. 12 (b) shows the end portion of the branches of the pixel electrode having a constant width. Referring to FIG. 12, in the end portion E of the branches 191a2, 191a4, 191b2, and 191b4 of the pixel electrodes 191a and 191b of the liquid crystal display according to the illustrated exemplary embodiment, the angle θ1 between the edge thereof and the edge of a main portion of the branch is larger than the angle θ2 between the edge of the end of the branch of the pixel electrode having the uniform width and the main portion of the branch. Accordingly, when the width of the branches is decreased closer to the distal end thereof at the end portion E of the branches 191a2, 191a4, 191b2, and 191b4 of the pixel electrodes 191a and 191b, the effect on liquid crystal molecules located between the end of the branches of the pixel electrodes 191a and 191b and the main portion of the branches may be reduced. By this, the irregular movement of the liquid crystal molecules that may appear by the interaction between the end portion of the branches of the pixel electrodes 191a and 191b and the branches may be reduced or effectively prevented, and thereby the display quality deterioration that may be generated in the end portion of the branches may be reduced or effectively prevented.

All characteristics of the exemplary embodiment of a liquid crystal display according to the invention that is shown in FIG. 4, FIG. 5, FIG. 6, FIG. 8, FIG. 9, and FIG. 10 may be applied to all liquid crystal displays according to the illustrated exemplary embodiment.

Figure 13:
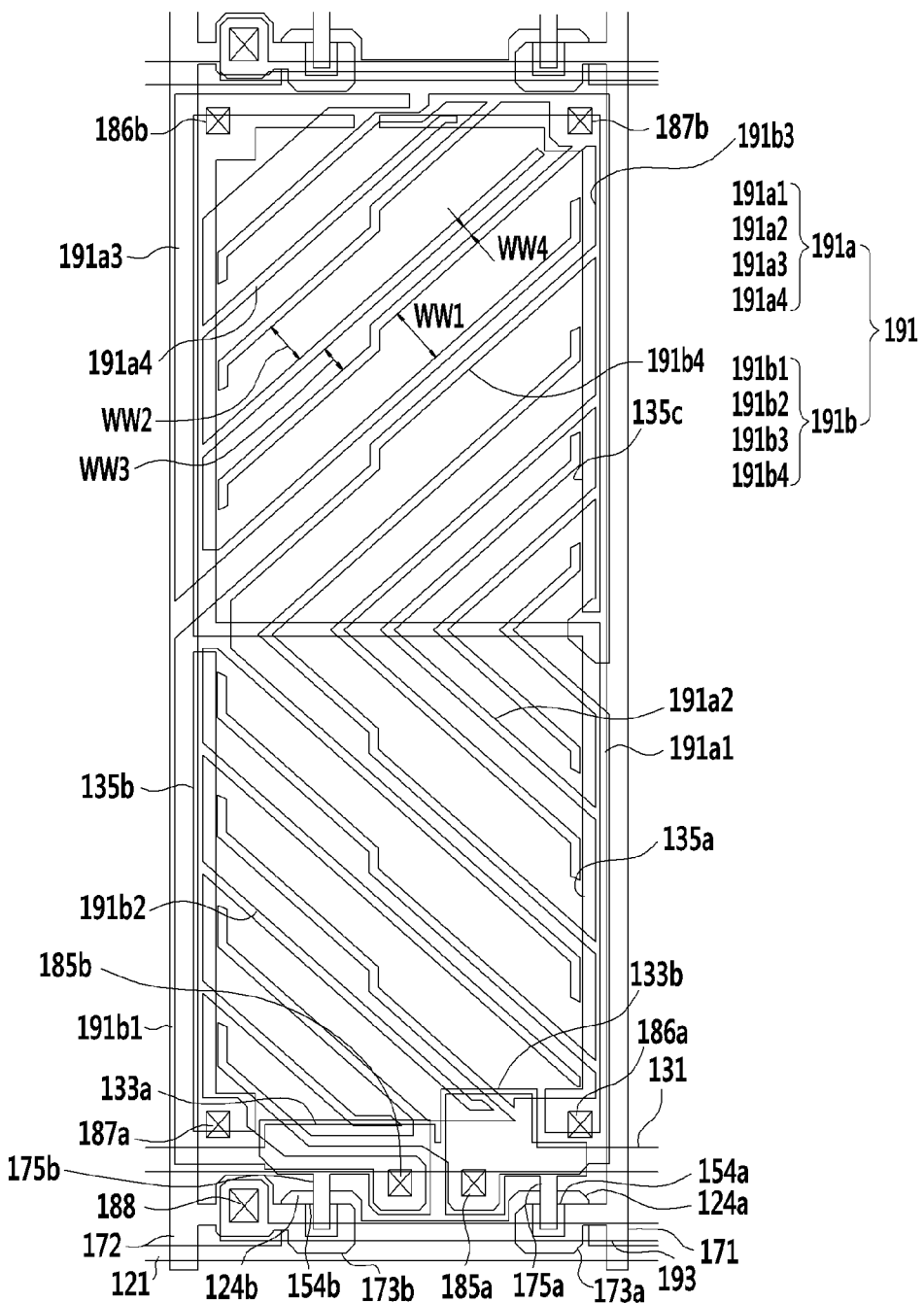
FIG. 13 is a plan view of another exemplary embodiment of a liquid crystal display according to the invention.

Next, another exemplary embodiment of a liquid crystal display according to the invention will be described with reference to FIG. 13. FIG. 13 is a plan view of another exemplary embodiment of a liquid crystal display according to the invention.

Referring to FIG. 13, the liquid crystal display is similar to the liquid crystal display according to the above-described exemplary embodiments.

One pixel electrode 191 includes the first sub-pixel electrode 191a and the second sub-pixel electrode 191b, the entire outer shape of one pixel electrode 191 is a quadrangle, and the first pixel electrode 191a and the second pixel electrode 191b engage with each other. The first pixel electrode 191a and the second pixel electrode 191b are symmetrical with respect to the imaginary transverse central line, and are respectively divided into the two sub-regions, such as the upper sub-region and the lower sub-region.

The first pixel electrode 191a includes a lower stem 191a1 and an upper stem 191a3, and a plurality of the first branches 191a2 and a plurality of the second branches 191a4 extending from the lower stem 191a1 and the upper stem 191a3, respectively. The second pixel electrode 191b includes a lower stem 191b1 and an upper stem 191b3, and a plurality of the third branches 191b2 and a plurality of the fourth branches 191b4 extending from the lower stem 191b1 and the upper stem 191b3, respectively.

The lower stem 191a1 and the upper stem 191a3 of the first pixel electrode 191a are disposed on the right side and the left side of one pixel electrode, and the lower stem 191b1 and the upper stem 191b3 of the second pixel electrode 191b are disposed on the left side and the right side of one pixel electrode.

By this, the magnitude of the parasitic capacitance formed by overlapping the data line 171 and the first voltage transmitting line 172 that are disposed on the left side and the right side of the one pixel electrode and the pixel electrode 191 may be formed to be symmetrical on the left side and the right side of the pixel electrode such that the magnitudes of the parasitic capacitances between the first pixel electrode 191a and the second pixel electrode 191b, and the two left and right signal lines may be the same. As a result, crosstalk deterioration generated by the deviation of the right and left parasitic capacitances may be reduced or effectively prevented.

The angle of the plurality of branches 191a2, 191a4, 191b2, and 191b4 of the first pixel electrode 191a and the second pixel electrode 191b with respect to the transverse center line, may be about 45 degrees.

The branches 191a2, 191a4, 191b2, and 191b4 of the first pixel electrode 191a and the second pixel electrode 191b engage with each other with a predetermined interval therebetween and are alternately disposed, thereby forming a pectinated pattern.

However, different from the above-described liquid crystal display according to the exemplary embodiment, the liquid crystal display according to the illustrated exemplary embodiment includes the regions where the interval between the branches of the first pixel electrode 191a and the second pixel electrode 191b respectively are the first interval WW1, the second interval WW2, the third interval WW3, and the fourth interval WW4. Like this, the low gray region where the interval between the neighboring branches of the first pixel electrode 191a and the second pixel electrode 191b is wide, and the high gray region where the interval between the neighboring branches is narrow are not divided. The regions having at least four intervals WW1, WW2, WW3, and WW4 that are different between the neighboring branches of the first pixel electrode 191a and the second pixel electrode 191b are formed such that it is possible to vary the inclination angle of the liquid crystal molecules 31 of the liquid crystal layer 3 in at least four regions, and display different luminance with respect to one image information set by varying the interval between the first pixel electrodes 191a and the second pixel electrodes 191b in one pixel. Accordingly, the visibility of the liquid crystal display may be increased and the display quality of the liquid crystal display may be increased.

Also, in the liquid crystal display according to the illustrated exemplary embodiment, like the liquid crystal display according to the above-described exemplary embodiments, the low gray region is disposed in the portion that is not enclosed by the stems 191a1, 191a3, 191b1, and 191b3 of the first pixel electrode 191a and the second pixel electrode 191b among the pixel outer portion such that the region where the magnitude of the horizontal electric field between the first pixel electrode 191a and the second pixel electrode 191b is relatively weak is disposed. Accordingly, the display quality deterioration that can be generated by the asymmetry of the direction of the horizontal electric field between the first pixel electrode 191a and the second pixel electrode 191b such as texture. may be reduced.

All characteristics of the exemplary embodiment of the liquid crystal display according to the invention that is shown in FIG. 4, FIG. 5, FIG. 6, FIG. 8, FIG. 9, FIG. 10, and FIG. 11 may be applied to all liquid crystal displays according to the illustrated exemplary embodiment.

Figure 14:
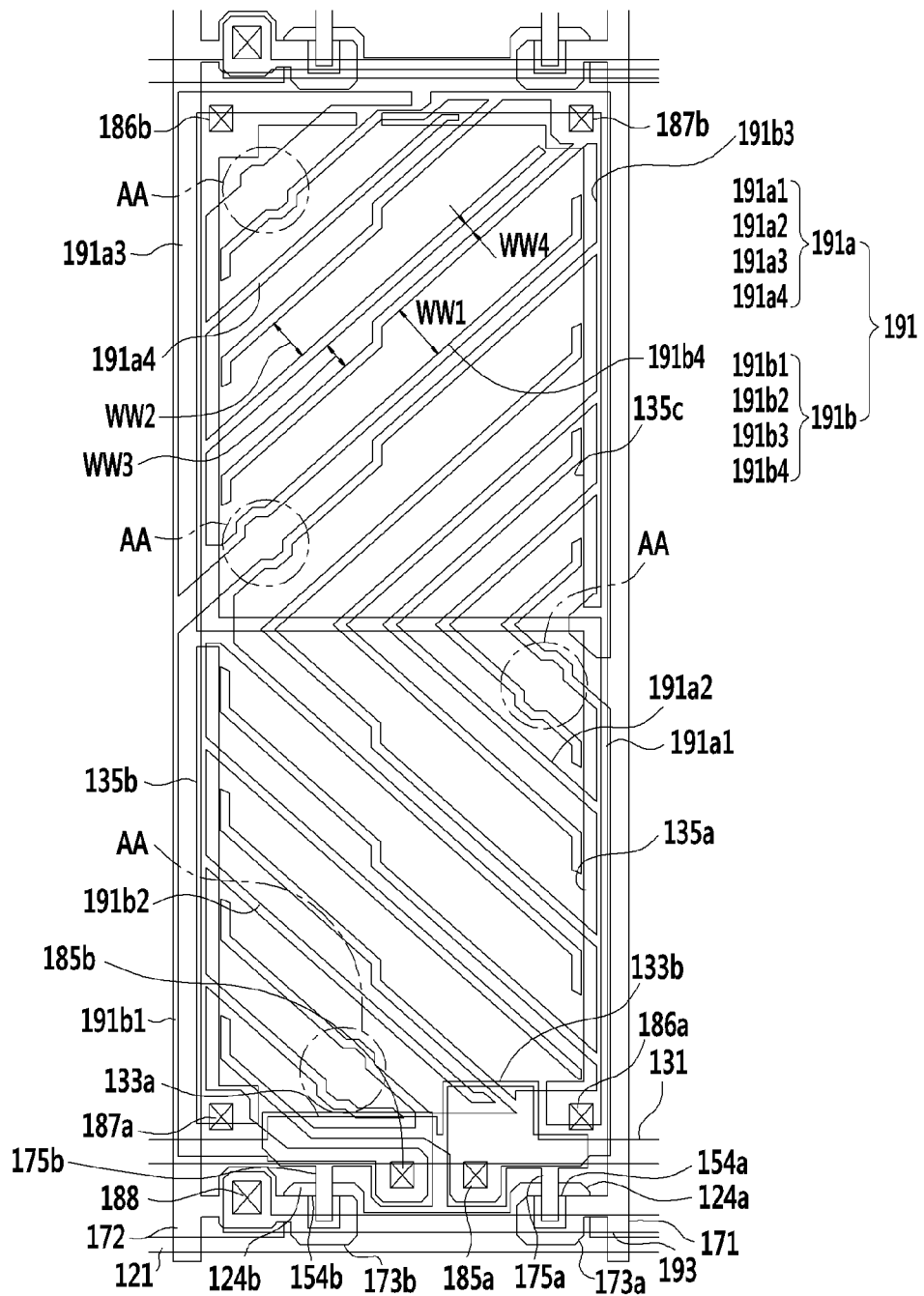
FIG. 14 is a plan view of another exemplary embodiment of a liquid crystal display according to the invention.

Next, another exemplary embodiment of a liquid crystal display according to the invention will be described with reference to FIG. 14. FIG. 14 is a plan view of another exemplary embodiment of a liquid crystal display according to the invention.

Referring to FIG. 14, the liquid crystal display is similar to the liquid crystal display according to the above-described exemplary embodiments.

One pixel electrode 191 includes the first sub-pixel electrode 191a and the second sub-pixel electrode 191b, the entire outer shape of one pixel electrode 191 is a quadrangle, and the first pixel electrode 191a and the second pixel electrode 191b engage with each other. The first pixel electrode 191a and the second pixel electrode 191b are symmetrical with respect to the imaginary transverse central line, and are respectively divided into the two sub-regions, such as the upper and the lower sub-region.

The first pixel electrode 191a includes a lower stem 191a1 and an upper stem 191a3, and a plurality of the first branches 191a2 and a plurality of the second branches 191a4 extending from the lower stem 191a1 and the upper stem 191a3, respectively. The second pixel electrode 191b includes a lower stem 191b1 and an upper stem 191b3, and a plurality of the third branches 191b2 and a plurality of the fourth branches 191b4 extending from the lower stem 191b1 and the upper stem 191b3, respectively.

The lower stem 191a1 and the upper stem 191a3 of the first pixel electrode 191a are disposed on the right side and the left side of one pixel electrode, and the lower stem 191b1 and the upper stem 191b3 of the second pixel electrode 191b are disposed on the left side and the right side of one pixel electrode.

By this, the magnitude of the parasitic capacitance formed by overlapping the data line 171 and the first voltage transmitting line 172 that are disposed on the left side and the right side of the one pixel electrode and the pixel electrode 191 may be formed to be symmetrical on the left side and the right side of the pixel electrode such that the magnitudes of the parasitic capacitances between the first pixel electrode 191a and the second pixel electrode 191b, and the two left and right signal lines may be the same. As a result, crosstalk deterioration generated by the deviation of the right and left parasitic capacitances may be reduced or effectively prevented.

The angle of the plurality of branches 191a2, 191a4, 191b2, and 191b4 of the first pixel electrode 191a and the second pixel electrode 191b with respect to the transverse center line may be about 45 degrees.

The branches 191a2, 191a4, 191b2, and 191b4 of the first pixel electrode 191a and the second pixel electrode 191b engage with each other with a predetermined interval therebetween and are alternately disposed, thereby forming a pectinated pattern.

The liquid crystal display according to the illustrated exemplary embodiment includes regions where the interval between the neighboring branches of the first pixel electrode 191a and second pixel electrode 191b respectively form the first interval WW1, the second interval WW2, the third interval WW3, and the fourth interval WW4. Like this, the low gray region where the interval between the neighboring branches of the first pixel electrode 191a and the second pixel electrode 191b is wide, and the high gray region where the interval between the neighboring branches is narrow are not divided. The regions having at least four intervals WW1, WW2, WW3, and WW4 that are different between the neighboring branches of the first pixel electrode 191a and the second pixel electrode 191b are formed such that it is possible to vary the inclination angle of the liquid crystal molecules 31 of the liquid crystal layer 3 in at least four regions and display different luminance with respect to one image information set by varying the interval between the first pixel electrodes 191a and the second pixel electrodes 191b in one pixel. By this, the visibility of the liquid crystal display may be increased and the display quality of the liquid crystal display may be increased.

Also, in the liquid crystal display according to the illustrated exemplary embodiment, like the liquid crystal display according to the above-described exemplary embodiments, the low gray region is disposed in the portion that is not enclosed by the stems 191a1, 191a3, 191b1, and 191b3 of the first pixel electrode 191a and the second pixel electrode 191b among the pixel outer portion such that the region where the magnitude of the horizontal electric field between the first pixel electrode 191a and the second pixel electrode 191b is relatively weak is disposed. Accordingly, the display quality deterioration that can be generated by the asymmetry of the direction of the horizontal electric field between the first pixel electrode 191a and the second pixel electrode 191b such as texture, may be reduced.

Also, like the liquid crystal display according to the above-described exemplary embodiment, the liquid crystal display according to the illustrated exemplary embodiment may have the extension region AA where the interval between the branches 191a2 and 191a4 of the first pixel electrode 191a and the branches 191b2 and 191b4 of the second pixel electrode 191b are extended. The interval between the branches 191a2 and 191a4 of the first pixel electrode 191a and the branches 191b2 and 191b4 of the second pixel electrode 191b in the extension region AA may be about 20 µm to about 28 µm.

By this, the liquid crystal molecules 31 disposed at the extension region AA are relatively weak with regard to the influence of the horizontal electric field that is formed between the branches 191a2 and 191a4 of the first pixel electrode 191a and the branches 191b2 and 191b4 of the second pixel electrode 191b. Accordingly, the liquid crystal molecules 31 disposed at the extension region AA are less influenced by the asymmetric horizontal electric field, and the liquid crystal molecules 31 have the large capacity to maintain the vertical alignment state that is the initial alignment state such that irregular slanting of the liquid crystal molecules by the external pressure may be reduced or effectively prevented. Accordingly, the irregular movement of the liquid crystal molecules being diffused from the outer part of the pixel area to the inner part of the pixel area is reduced or effectively prevented, and the singular point limited in the extension region AA is formed such that the large-sized display quality deterioration that flows from the outer part of the pixel area to the inner part of the pixel area may be reduced or effectively prevented.

All characteristics of the exemplary embodiment of the liquid crystal display according to the invention that is shown in FIG. 4, FIG. 5, FIG. 6, FIG. 8, FIG. 9, FIG. 10, FIG. 11, and FIG. 13 may be applied to all liquid crystal displays according to the illustrated exemplary embodiment.

Figure 15:
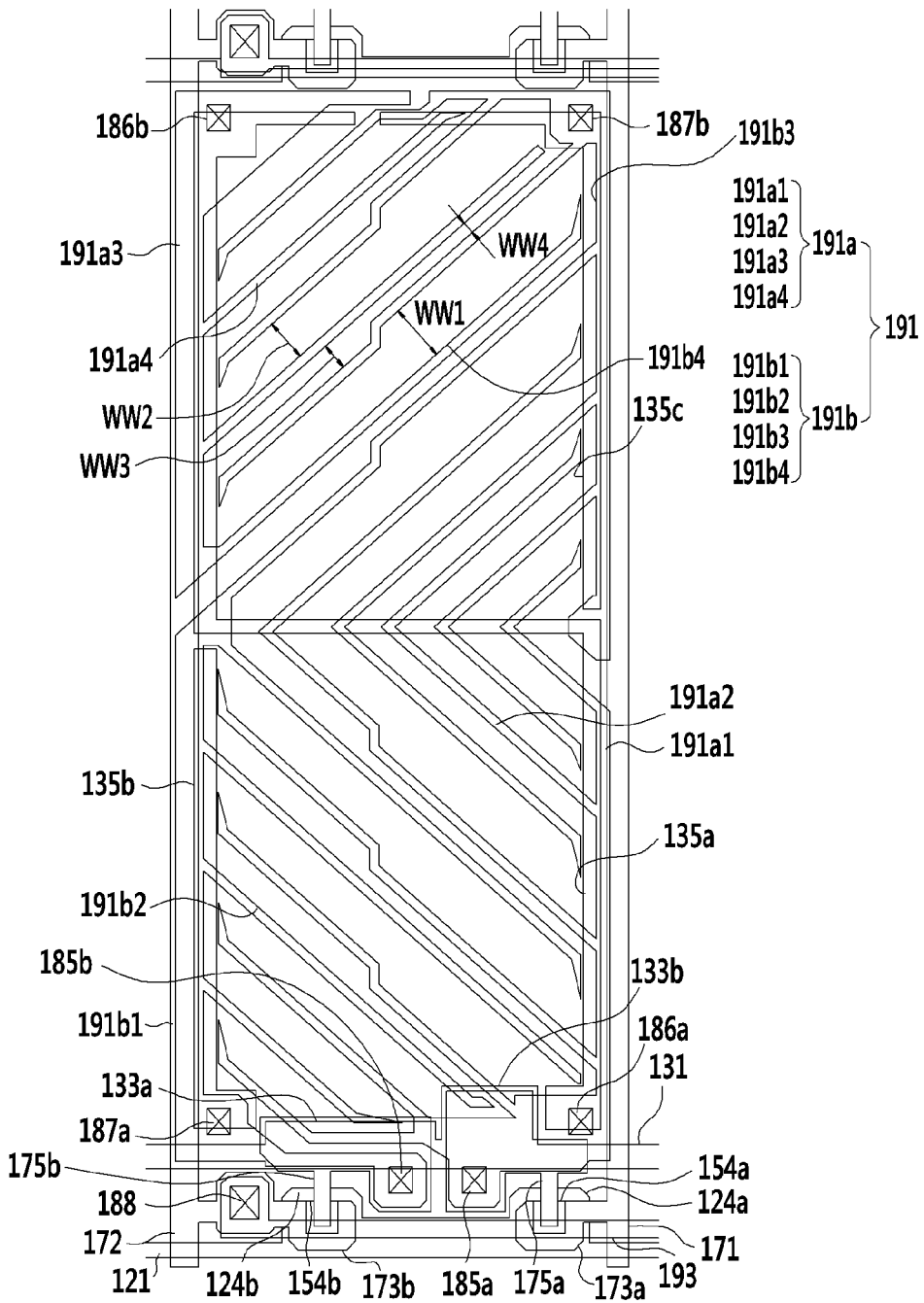
FIG. 15 is a plan view of another exemplary embodiment of a liquid crystal display according to the invention.

Next, another exemplary embodiment of a liquid crystal display according to the invention will be described with reference to FIG. 15. FIG. 15 is a plan view of another exemplary embodiment of a liquid crystal display according to the invention.

Referring to FIG. 15, the liquid crystal display is similar to the liquid crystal display according to the above described exemplary embodiments.

One pixel electrode 191 includes the first sub-pixel electrode 191a and the second sub-pixel electrode 191b, the entire outer shape of one pixel electrode 191 is a quadrangle, and the first pixel electrode 191a and the second pixel electrode 191b engage with each other. The first pixel electrode 191a and the second pixel electrode 191b are symmetrical with respect to the imaginary transverse central line, and are respectively divided into the two sub-regions, such as the upper sub-region and the lower sub-region.

The first pixel electrode 191a includes a lower stem 191a1 and an upper stem 191a3, and a plurality of the first branches 191a2 and a plurality of the second branches 191a4 extending from the lower stem 191a1 and the upper stem 191a3, respectively. The second pixel electrode 191b includes a lower stem 191b1 and an upper stem 191b3, and a plurality of the third branches 191b2 and a plurality of the fourth branches 191b4 extending from the lower stem 191b1 and the upper stem 191b3, respectively.

The lower stem 191a1 and the upper stem 191a3 of the first pixel electrode 191a are disposed on the right side and the left side of one pixel electrode, and the lower stem 191b1 and the upper stem 191b3 of the second pixel electrode 191b are disposed on the left side and the right side of one pixel electrode.

By this, the magnitude of the parasitic capacitance formed by overlapping the data line 171 and the first voltage transmitting line 172 that are disposed on the left side and the right side of the one pixel electrode and the pixel electrode 191 may be formed to be symmetrical on the left side and the right side of the pixel electrode such that the magnitudes of the parasitic capacitances between the first pixel electrode 191a and the second pixel electrode 191b, and the two left and right signal lines, may be the same. As a result, crosstalk deterioration generated by the deviation of the right and left parasitic capacitances may be reduced or effectively prevented.

The angle of the plurality of branches 191a2, 191a4, 191b2, and 191b4 of the first pixel electrode 191a and the second pixel electrode 191b with respect to the transverse center line, may be about 45 degrees.

The branches 191a2, 191a4, 191b2, and 191b4 of the first pixel electrode 191a and the second pixel electrode 191b engage with each other with a predetermined interval therebetween and are alternately disposed, thereby forming a pectinated pattern.

The liquid crystal display according to the illustrated exemplary embodiment includes regions where the interval between the neighboring branches of the first pixel electrode 191a and second pixel electrode 191b respectively form the first interval WW1, the second interval WW2, the third interval WW3, and the fourth interval WW4. Like this, the low gray region where the interval between the neighboring branches of the first pixel electrode 191a and the second pixel electrode 191b is wide, and the high gray region where the interval between the neighboring branches is narrow are not divided. The regions having at least four intervals WW1, WW2, WW3, and WW4 that are different between the neighboring branches of the first pixel electrode 191a and the second pixel electrode 191b are formed such that it is possible to vary the inclination angle of the liquid crystal molecules 31 of the liquid crystal layer 3 in at least four regions, and display different luminance with respect to one image information set by varying the interval between the first pixel electrodes 191a and the second pixel electrodes 191b in one pixel. By this, the visibility of the liquid crystal display may be increased and the display quality of the liquid crystal display may be increased.

Also, in the liquid crystal display according to the illustrated exemplary embodiment, like the liquid crystal display according to the above-described exemplary embodiments, the low gray region is disposed in the portion that is not enclosed by the stems 191a1, 191a3, 191b1, and 191b3 of the first pixel electrode 191a and the second pixel electrode 191b among the pixel outer portion such that the region where the magnitude of the horizontal electric field between the first pixel electrode 191a and the second pixel electrode 191b is relatively weak is disposed. Accordingly, the display quality deterioration that can be generated by the asymmetry of the direction of the horizontal electric field between the first pixel electrode 191a and the second pixel electrode 191b such as texture, may be reduced.

In, the liquid crystal display according to the illustrated exemplary embodiment, the width of the branches is decreased closer to the distal end thereof in an end portion E of the branches 191a2, 191a4, 191b2, and 191b4 of the pixel electrodes 191a and 191b. In the end portion of the branches 191a2, 191a4, 191b2, and 191b4 of the pixel electrodes 191a and 191b of the liquid crystal display according to the illustrated exemplary embodiment, the angle between the edge thereof and the edge of a main portion of the branch is larger than the angle between the edge of the end of the branch of the pixel electrode having the uniform width and the main portion of the branch. Accordingly, when the width of the branches is decreased closer to the distal end thereof at the end portion of the branches 191a2, 191a4, 191b2, and 191b4 of the pixel electrodes 191a and 191b, the effect on liquid crystal molecules located between the end of the branches of the pixel electrodes 191a and 191b and the main portion of the branches may be reduced. By this, the irregular movement of the liquid crystal molecules that may appear by the interaction between the end portion of the branches of the pixel electrodes 191a and 191b and the branches may be reduced or effectively prevented, and thereby the display quality deterioration that may be generated in the end portion of the branches may be reduced or effectively prevented.

All characteristics of the exemplary embodiment of a liquid crystal display according to the invention that is shown in FIG. 4, FIG. 5, FIG. 6, FIG. 8, FIG. 9, FIG. 10, FIG. 11, FIG. 13, and FIG. 14 may be applied to all liquid crystal displays according to the illustrated exemplary embodiment.

The arrangements of signal lines and the pixels, and the driving methods thereof of the liquid crystal displays according to the above-described exemplary embodiments may be applied to a pixel of all shapes, including the first pixel electrode and the second pixel electrode of which at least portions are in the same layer and are alternately disposed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A liquid crystal display comprising:
a first substrate, and a second substrate facing the first substrate;
a liquid crystal layer between the first substrate and the second substrate, and including liquid crystal molecules;
a data line on the first substrate;
a first pixel electrode and a second pixel electrode on the first substrate and separated from each other,
wherein
the first pixel electrode comprises a first stem at an edge of a pixel area and a plurality of first branches extended from the first stem, the first stem at the edge of the pixel area extended parallel to the data line,
the second pixel electrode comprises a second stem at the edge of the pixel area and a plurality of second branches extended from the second stem, the second stem at the edge of the pixel area extended parallel to the data line, and
the first branches of the first pixel electrode and the second branches of the second pixel electrode are alternately disposed in the pixel area;
wherein the liquid crystal display further comprises:
a first region including a first interval between the first branches of the first pixel electrode and the second branches of the second pixel electrode adjacent to each other; and
a second region including a second interval between the first branches of the first pixel electrode and the sec- ond branches of the second pixel electrode adjacent to each other, the second interval being smaller than the first interval, and wherein an interval between the first stem parallel to the data line and the second stem parallel to the data line, at the edge of the pixel area, is substantially the first interval between the first branches of the first pixel electrode and the adjacent second branches of the second pixel electrode adjacent to each other in the first region.

2. The liquid crystal display of claim 1, wherein the liquid crystal layer is vertically aligned.

3. The liquid crystal display of claim 2, wherein the first pixel electrode and the second pixel electrode are applied with voltages having different polarities.

4. The liquid crystal display of claim 3, wherein
in the first region, the first interval between the first branches of the first pixel electrode and the second branches of the second pixel electrode adjacent to each other is uniform, and
in the second region, the second interval between the first branches of the first pixel electrode and the second branches of the second pixel electrode adjacent to each other is uniform.

5. The liquid crystal display of claim 4, wherein a ratio of a total area of the first region to a total area of the second region is in a range of about 2:1 to about 30:1.

6. The liquid crystal display of claim 4, wherein the first interval between the first branches of the first pixel electrode and the second branches of the second pixel electrode adjacent to each other is in a range of about 10 micrometers to about 20 micrometers, and
the second interval between the first branches of the first pixel electrode and the second branches of the second pixel electrode adjacent to each other is in a range about 3 micrometers to about 9 micrometers.

7. The liquid crystal display of claim 1, wherein a ratio of a total area of the first region to a total area of the second region is in a range of about 2:1 to about 30:1.

8. The liquid crystal display of claim 1, wherein the first interval between the first branches of the first pixel electrode and the second branches of the second pixel electrode adjacent to each other is in a range of about 10 micrometers to about 20 micrometers, and
the second interval between the first branches of the first pixel electrode and the second branches of the second pixel electrode adjacent to each other is in the range about 3 micrometers to about 9 micrometers.

9. The liquid crystal display of claim 1, the first region further including an extension portion where a third interval between the branches of the first pixel electrode and the adjacent branches of the second pixel electrode is larger than the first interval between the branches of the first pixel electrode and the adjacent branches of the second pixel.

10. The liquid crystal display of claim 9, wherein the third interval between the branches of the first pixel electrode and the adjacent branches of the second pixel electrode is in a range of about 20 micrometers to about 28 micrometers.

11. The liquid crystal display of claim 10, wherein the first interval between the branches of the first pixel electrode and the adjacent branches of the second pixel electrode is in a range of about 10 micrometers to about 20 micrometers, and the second interval between the branches of the first pixel electrode and the adjacent branches of the second pixel electrode is in a range about 3 micrometers to about 9 micrometers.

12. The liquid crystal display of claim 10, wherein
in the extension portion, a plane shape of the branches of the first pixel electrode and the adjacent branches of the second pixel electrode is polygonal.

13. The liquid crystal display of claim 12, wherein
in the extension portion, the plane shape of the branches of the first pixel electrode and the adjacent branches of the second pixel electrode is hexagonal, quadrangular, or rhomboidal.

14. The liquid crystal display of claim 10, wherein
in the extension portion, a plane shape of the branches of the first pixel electrode and the adjacent branches of the second pixel electrode is circular.

15. The liquid crystal display of claim 1, further comprising
a conductor disposed on the first substrate, traversing the center of the pixel area, and applied with a voltage having the same polarity as a signal applied to the first pixel electrode,
wherein the second branches of the second pixel electrode near the edge insulated from and intersecting the conductor while forming an acute angle along with the conductor among the edge of the first branches of the first pixel electrode form the second region, and
the second branches of the second pixel electrode near the edge insulated from and intersecting the conductor while forming an obtuse angle along with the conductor among the edge of the first branches of the first pixel electrode form the first region.

16. The liquid crystal display of claim 15, the first region further including an extension portion including a third interval between the branches of the first pixel electrode and the adjacent branches of the second pixel electrode larger than the first interval between the branches of the first pixel electrode and the adjacent branches of the second pixel electrode.

17. The liquid crystal display of claim 1, wherein:
the branches of the first pixel electrode and of the second pixel electrode comprise a first edge parallel to an outer edge of the pixel area, and
a width of the branches defined with the first edge is decreased closer to an end of the branches.

18. The liquid crystal display of claim 17, the first region further including an extension portion where a third interval between the branches of the first pixel electrode and the adjacent branches of the second pixel electrode is larger than the first interval between the branches of the first pixel electrode and the adjacent branches of the second pixel electrode.

19. The liquid crystal display of claim 17, further comprising
a conductor disposed on the first substrate, traversing the center of the pixel area, and applied with a voltage having the same polarity as a signal applied to the first pixel electrode,
wherein the branches of the second pixel electrode near the edge insulated from and intersecting the conductor while forming an acute angle along with the conductor among the edge of the branches of the first pixel electrode form the second region, and
the branches of the second pixel electrode near the edge insulated from and intersecting the conductor while forming an obtuse angle along with the conductor among the edge of the branches of the first pixel electrode form the first region.

20. The liquid crystal display of claim 19, further comprising
- an extension portion where the interval between the branches of the first pixel electrode and the branches of the second pixel electrode is more widely expanded than the interval between the branches of the first pixel electrode and the branches of the second pixel electrode in the first region.

21. The liquid crystal display of claim 1, further comprising
- a third region including a third interval between the branches of the first pixel electrode and the adjacent branches of the second pixel electrode which is smaller than the first interval and is larger than the second interval.

22. The liquid crystal display of claim 21, the first region further including an extension portion where a fourth interval between the branches of the first pixel electrode and the adjacent branches of the second pixel electrode is larger than the first interval between the branches of the first pixel electrode and the adjacent branches of the second pixel electrode.

23. The liquid crystal display of claim 22, further comprising
- a conductor disposed on the first substrate, traversing the center of the pixel area, and applied with a voltage having the same polarity as a signal applied to the first pixel electrode,
- wherein the branches of the second pixel electrode near the edge insulated from and intersecting the conductor while forming an acute angle along with the conductor among the edge of the branches of the first pixel electrode form the second region, and
- the branches of the second pixel electrode near the edge insulated from and intersecting the conductor while forming an obtuse angle along with the conductor among the edge of the branches of the first pixel electrode form the first region.

24. The liquid crystal display of claim 23, wherein
- the branches of the first pixel electrode and the second pixel electrode comprise a first edge parallel to an outer edge of the pixel area, and
- a width of the branches defined with the first edge is decreased closer to an end of the branches.

25. The liquid crystal display of claim 21, further comprising
- a conductor disposed on the first substrate, traversing the center of the pixel area, and applied with a voltage having the same polarity as a signal applied to the first pixel electrode,
- wherein the branches of the second pixel electrode near the edge insulated from and intersecting the conductor while forming an acute angle along with the conductor among the edge of the branches of the first pixel electrode form the second region, and
- the branches of the second pixel electrode near the edge insulated from and intersecting the conductor while forming an obtuse angle along with the conductor among the edge of the branches of the first pixel electrode form the first region.

26. The liquid crystal display of claim 25, wherein
- the branches of the first pixel electrode and the second pixel electrode comprise a first edge parallel to an outer edge of the pixel area, and
- a width of the branches defined with the first edge is decreased closer to an end of the branches.

27. The liquid crystal display of claim 21, wherein
- the branches of the first pixel electrode and the second pixel electrode comprise a first edge parallel to an outer edge of the pixel area, and
- a width of the branches defined with the first edge is decreased closer to an end of the branches.

28. The liquid crystal display of claim 21, further comprising
- a fourth region including a fourth interval between the branches of the first pixel electrode and the adjacent branches of the second pixel electrode is different from the intervals of the first region, the second region, and the third region.

29. The liquid crystal display of claim 28, the first region further including an extension portion where a fifth interval between the branches of the first pixel electrode and the adjacent branches of the second pixel electrode is larger than the first interval between the branches of the first pixel electrode and the branches of the second pixel electrode.

30. The liquid crystal display of claim 29, further comprising
- a conductor disposed on the first substrate, traversing the center of the pixel area, and applied with a voltage having the same polarity as a signal applied to the first pixel electrode,
- wherein the branches of the second pixel electrode near the edge insulated from and intersecting the conductor while forming an acute angle along with the conductor among the edge of the branches of the first pixel electrode form the second region, and
- the branches of the second pixel electrode near the edge insulated from and intersecting the conductor while forming an obtuse angle along with the conductor among the edge of the branches of the first pixel electrode form the first region.

31. The liquid crystal display of claim 30, wherein
- the branches of the first pixel electrode and the second pixel electrode comprise a first edge parallel to an outer edge of the pixel area, and
- a width of the branches defined with the first edge is decreased closer to an end of the branches.

32. The liquid crystal display of claim 28, further comprising
- a conductor disposed on the first substrate, traversing the center of the pixel area, and applied with a voltage having the same polarity as a signal applied to the first pixel electrode,
- wherein the branches of the second pixel electrode near the edge insulated from and intersecting the conductor while forming an acute angle along with the conductor among the edge of the branches of the first pixel electrode form the second region, and
- the branches of the second pixel electrode near the edge insulated from and intersecting the conductor while forming an obtuse angle along with the conductor among the edge of the branches of the first pixel electrode form the first region.

33. The liquid crystal display of claim 32, wherein
- the branches of the first pixel electrode and the second pixel electrode comprise a first edge parallel to an outer edge of the pixel area, and
- a width of the branches defined with the first edge is decreased closer to an end of the branches.

34. The liquid crystal display of claim 28, wherein
the branches of the first pixel electrode and the second pixel electrode comprise a first edge parallel to an outer edge of the pixel area, and
a width of the branches defined with the first edge is decreased closer to an end of the branches.

* * * * *